INVENTOR
ROBERT E. PARIS
BY Ralph C. Dustin
ATTORNEY

Dec. 13, 1955 R. E. PARIS 2,726,601

MULTIPLE LINE PRINTER

Filed March 9, 1950 12 Sheets-Sheet 2

INVENTOR
ROBERT E. PARIS
BY Ralph C. Dustin
ATTORNEY

Dec. 13, 1955 R. E. PARIS 2,726,601

MULTIPLE LINE PRINTER

Filed March 9, 1950 12 Sheets-Sheet 3

INVENTOR
*ROBERT E. PARIS*

BY Ralph C. Dustin

ATTORNEY

Dec. 13, 1955 R. E. PARIS 2,726,601

MULTIPLE LINE PRINTER

Filed March 9, 1950 12 Sheets-Sheet 4

INVENTOR
ROBERT E. PARIS
BY Ralph C. Dustin
ATTORNEY

INVENTOR
ROBERT E. PARIS
BY Ralph C. Dustin
ATTORNEY

INVENTOR
ROBERT E. PARIS
BY Ralph C. Dustin
ATTORNEY

Dec. 13, 1955 R. E. PARIS 2,726,601

MULTIPLE LINE PRINTER

Filed March 9, 1950 12 Sheets-Sheet 7

INVENTOR
ROBERT E. PARIS

BY Ralph C. Dustin
ATTORNEY

Dec. 13, 1955 R. E. PARIS 2,726,601

MULTIPLE LINE PRINTER

Filed March 9, 1950 12 Sheets-Sheet 8

INVENTOR
ROBERT E. PARIS
BY Ralph C. Rustin
ATTORNEY

INVENTOR
ROBERT E. PARIS
BY Ralph C. Dustin
ATTORNEY

INVENTOR
ROBERT E. PARIS
BY Ralph C. Austin
ATTORNEY

INVENTOR
ROBERT E. PARIS
BY Ralph C. Dustin
ATTORNEY

INVENTOR
ROBERT E. PARIS
BY Ralph C. Rustin
ATTORNEY

United States Patent Office 2,726,601
Patented Dec. 13, 1955

2,726,601

MULTIPLE LINE PRINTER

Robert E. Paris, Poughkeepsie, N. Y., assignor to International Business Machines Corporation, New York, N. Y., a corporation of New York Application March 9, 1950, Serial No. 148,576

22 Claims. (Cl. 101—93)

This invention relates to printing machines, and more particularly to machines which are operable under the control of a perforated record to print characters simultaneously on one or more lines.

In the Paris Patent 2,398,036 there is shown a printing machine having a carriage which supports a single row of type members adapted to be struck by hammers for effecting a printing operation. The carriage is reciprocated so that each of a sequence of type members bearing all the type characters passes in front of the hammers once during each machine cycle. Storage mechanisms are adjusted during each cycle in reponse to the successive reading of perforations in card columns, and the storage mechanisms are operated at the end of the cycle to set up pins in control units which determine the actuation of hammers during the next machine cycle. A permutation bar is reciprocated with the type carriage so that it cooperates with the pins of the control units and effects an operation of the latter at the proper times for releasing hammers to strike the type members as they pass by. Data is read into the storage mechanisms during one cycle and is printed during the following cycle. There is, however, a reading and a printing of data during each cycle, and the data is printed complete on a single line.

The printing machine of the present invention is similar to that of the patent mentioned above but it is adapted to read and to print the same data within one machine cycle. Type members are arranged in a plurality of rows on frames moving continuously in one direction past the ends of hammers, and means are provided for actuating the hammers so as to strike the type members for printing characters simultaneously in any one or more of the rows. Data to be printed is represented by perforations in columns of index points arranged in one or more decks of a card, and storage mechanisms are provided with means engageable simultaneously with each of the index points for sensing the perforations. Mechanisms having means for sensing perforations at seven index points in each column have been found to operate satisfactorily in controlling the hammer operating means, but the mechanisms could be designated to operate as well from any other code.

A preferred form of sensing means comprises pins arranged to engage all of the card index points simultaneously, and each of the pins is supported for displacement by the card if there is no perforation at the point sensed. If desired, an electrical sensing means could be provided in place of the mechanically operated pins, and members could be set up in storage mechanisms on the energizing of such sensing means. As soon as the pins are set up by the card, they are locked in place by latches which cooperate with permutation blocks moving in synchronism with the frames supporting the type members. When the latches are positioned by block surfaces corresponding to the character represented by the pin setup, the pins are unlocked to effect an actuation of the hammer operating means.

An object of this invention is to provide an improved printing machine which is operable under the control of a perforated record to print characters simultaneously on one or more lines.

Another object is to provide a printing machine in which characters represented by perforations in a record card are read and printed in one machine cycle.

Yet another object is to provide a printing machine having improved means engageable simultaneously with a plurality of card index points for sensing perforations therein.

Still another object is to provide an improved mechanism for positioning a perforated record card relative to a sensing mechanism so as to obtain a simultaneous sensing of perforations at a plurality of index points.

Another object is to provide an improved storage mechanism which is adapted to be adjusted in response to the sensing of perforations in cards and to hold its adjustment until released by a permutation member at a time which depends upon the adjustment made.

Still another object is to provide a printing mechanism having type carriers and permutation members moving in synchronism continuously in the same direction, the permutation members controlling the operation of means for actuating hammers to engage the type while in motion.

Yet another object is to provide a printing mechanism which is adapted to print characters simultaneously on a plurality of lines with close spacing between the characters and the lines and yet having sufficient space for operating and control mechanisms.

Another object is to provide in a printing mechanism improved type members and actuating means therefor.

Other objects of the invention will be pointed out in the following description and claims and illustrated in the accompanying drawings, which disclose, by way of example, the principle of the invention and the best mode, which has been contemplated, of applying that principle.

*Card feed mechanism*

Figure 2:
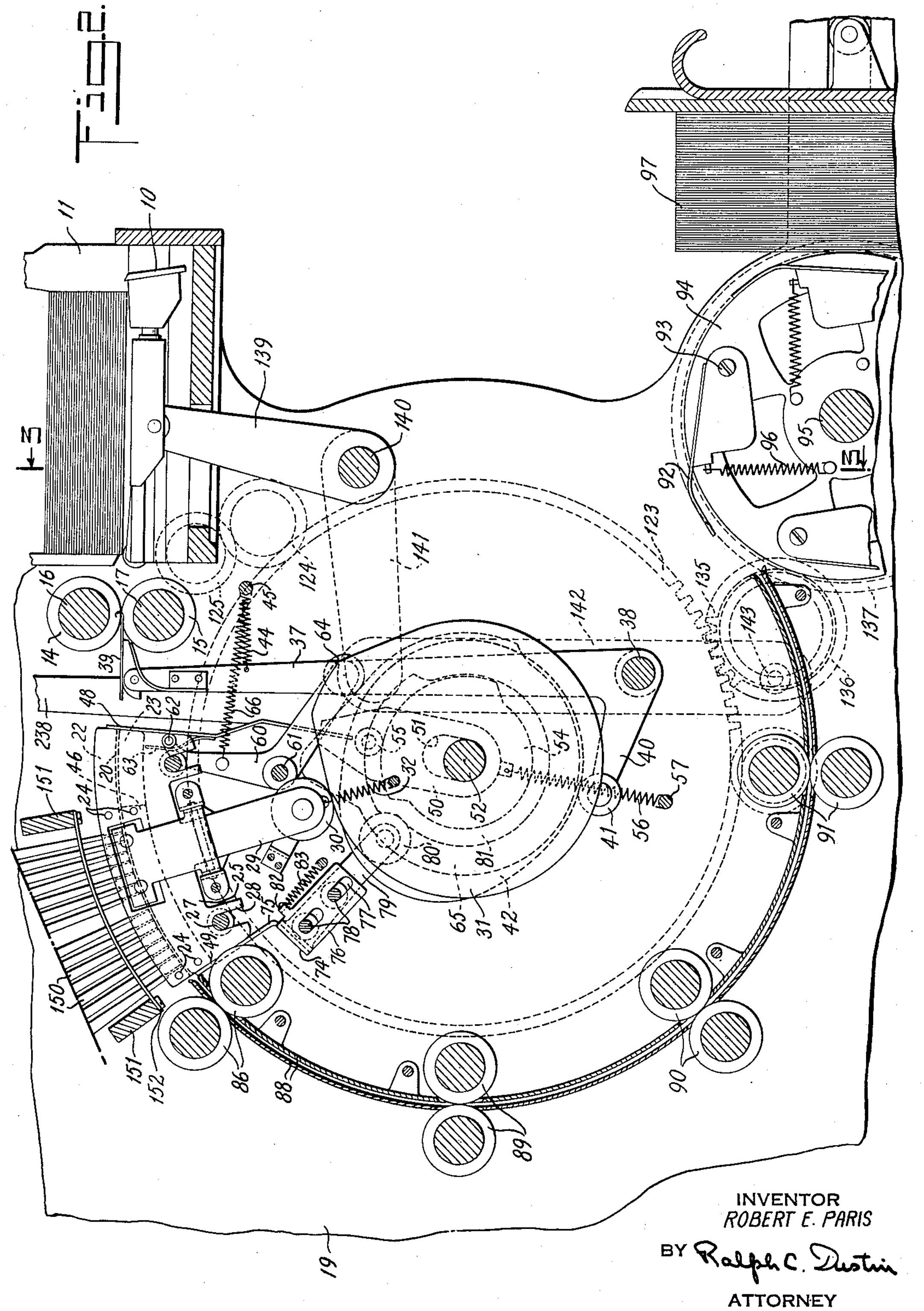
Fig. 2 is a vertical sectional view taken on the plane of the line 2—2 of Fig. 3 and showing the card feeding mechanism.
Figure 3:
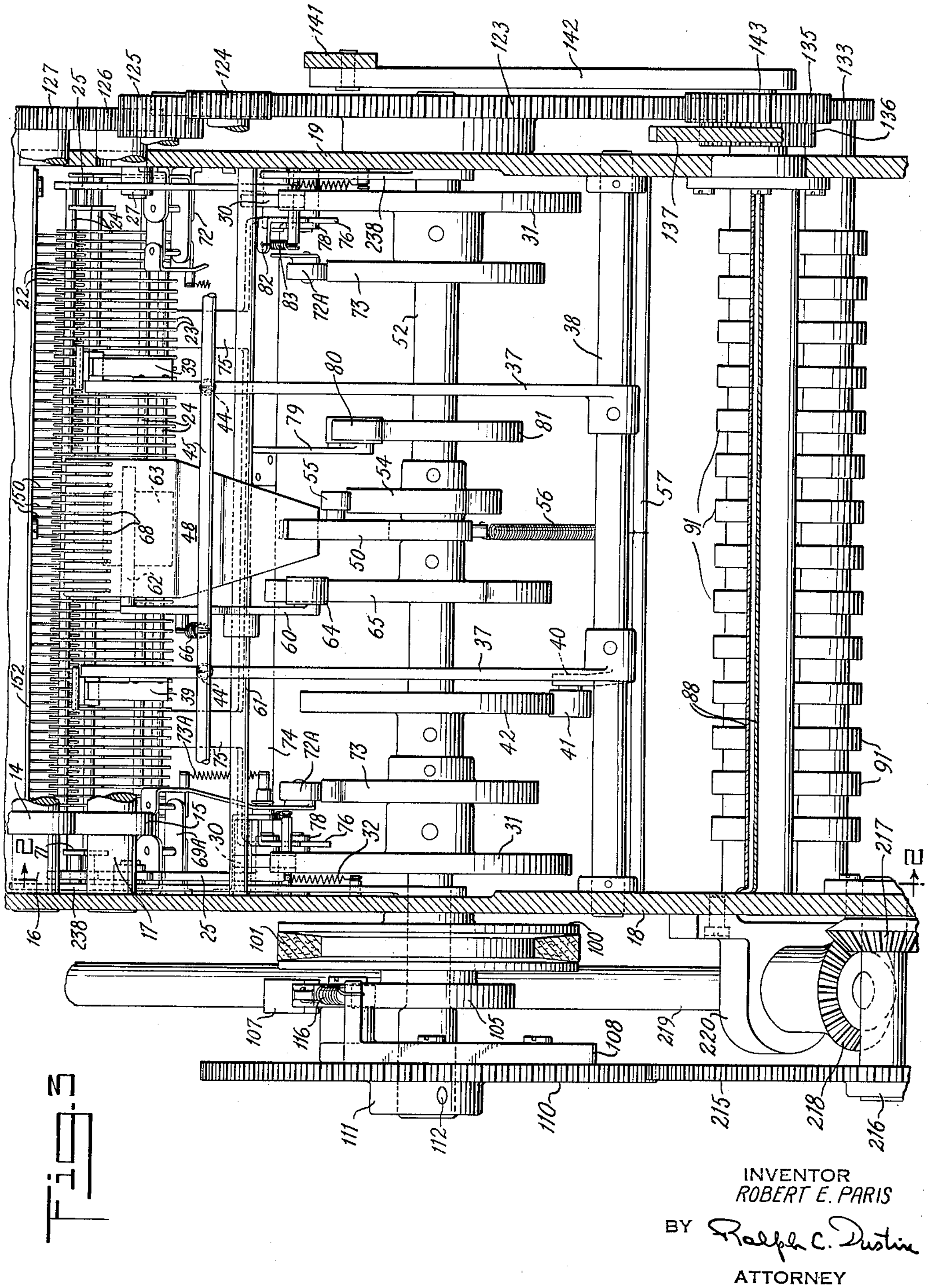
Fig. 3 is a vertical transverse section of the machine taken on the plane of the line 3—3 of Figs. 1 and 2 with the feed hopper, card picker and stacker mechanism removed.

In the illustrative embodiment of the invention there is provided, as shown in Fig. 2, a picker 10 which is adapted to move cards one at a time from the bottom of a card stack in a feed hopper 11 through the usual throat to feed rolls 14 and 15 mounted upon shafts 16 and 17 which are journaled, as shown in Fig. 3, in side plates 18 and 19 of a supporting frame. The feed rolls are driven, as will be described shortly, for advancing each card so that its leading edge enters a card chamber 20 (Figs. 2 and 18) formed by arcuate plates 22 and 23 mounted upon rods 24 at points spaced longitudinally thereof. The opposite ends of the rods are fixed to plates 25 which are adapted to be moved in a path extending normal to the arcuate plates at points midway between their ends. Pins 27 are fixed to the side plates 18, 19 and extend through notches 28 in the plates 25 for guiding the latter. Extending downwardly from each of the plates 25 is an arm 29 carrying a roller 30 which engages a cam 31 that is operable to move the plates 25 and the arcuate plates 22, 23 in the desired manner. A spring 32 is connected between the lower end of each arm 29 and a lug on one of the side plates for holding the roller 30 in yielding engagement with the cam 31.

The feed rolls 14 and 15 are arranged so as to feed each card only part way into the chamber 20. For advancing the card from the feed rolls further into the chamber there are provided two arms 37 fixed to a shaft 38 and carrying hooked members 39 engageable with the trailing edge of the card at spaced points. The shaft 38 is rotatably supported at its ends by the side plates 18, 19, and an arm 40 is made integral with one of the arms 37 and carries a roller 41 in engagement with a cam 42 for effecting the desired rocking motion. A spring 44 connects each of the arms 37 to a rod 45 carried by the plates 18, 19 for holding the roller 41 in yielding engagement with the cam 42. To permit the arms 37 to swing in a counterclockwise direction in Fig. 2, the arcuate plates 23 in line with the arms are cut back to a point 46. The swing of the arms 37 is only sufficient to move the card clear of the feed rolls so that a plate 48 may engage the trailing edge of the card between the arms and move it into the chamber 20 until it engages a gate 49. The plate 48 is connected at its lower end to a member 50 having an elongated slot 51 through which a shaft 52 extends freely. The shaft 52 is rotatably supported by the side plates 18, 19 and has the cams 31 and 42 fixed thereto. Another cam 54 is fixed to the shaft 52 to cooperate with a roller 55 carried by the member 50 for positioning the plate 48 in a vertical direction. A spring 56 is connected between the lower end of the member 50 and a rod 57 for holding the roller 55 in yielding engagement with the cam 54. For moving the plate 48 laterally, there is provided a lever 60 pivotally mounted on a rod 61 extending between the side plates 18 and 19. One arm of the lever carries a finger 62 extending between the plate 48 and a resilient member 63 attached at its lower edge to the plate, and another arm of the lever carries a roller 64 cooperating with a cam 65 fixed to the shaft 52. A spring 66 is connected between the lever 60 and the rod 45 for holding the roller 64 in yielding engagement with the cam 65.

The cams 54 and 65 are so shaped that the plate 48 is moved downwardly and to the right in Fig. 2 until it reaches a position to engage the trailing edge of the card after it has been advanced by the hooked members 39. The plate is then raised to a position behind the card and moved to the left for advancing the card into the chamber until it engages the gate 49 which will then be in a raised position. The upper edge of the plate 48 is slotted at 68 for receiving the arcuate plates 22, 23 as it is moved laterally.

Figure 18:
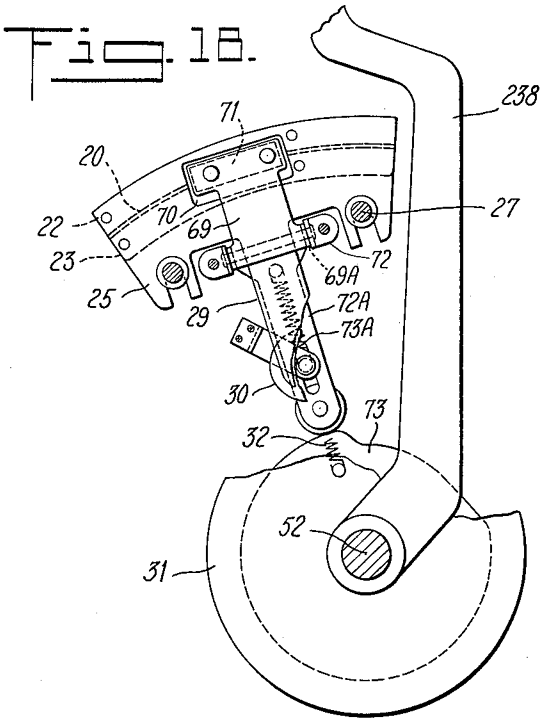
Fig. 18 is a detail view taken at the right hand side of the plate 18 in Fig. 3 and having parts broken away to show the mechanism for centering the card transversely of the card chamber.

Before the card is sensed it must be centered transversely of the chamber 20 to align its index points with sensing devices which will be described shortly. This transverse centering means comprises, as shown in Figs. 3 and 18, a member 69 at each side of the card chamber carrying pins which extend through an opening 70 in the plate 25 and support at their inner ends a plate 71 engageable with an end of the card. At the lower edge of the member 69 are inwardly projecting fingers 69A pivotally supported at points between their ends by brackets 72 fixed to the side plates 18, 19. Attached to the inner ends of the fingers is a follower 72A cooperating with a cam 73 on the shaft 52 for effecting a swinging of the member 69 about its pivotal support. A spring 73A holds the follower in yielding engagement with the cam 73, and the force exerted by each of the springs 73A is balanced by the force of the other. As the card approaches the gate 49, the members 69 are permitted to swing inwardly and engage the plates 71 with the ends of the card for centering the latter.

The gate 49 comprises (see Figs. 2 and 3) a plate 74 having upwardly bent portions 75 adapted to move across the discharge end of the card chamber 20 at spaced points. End portions 76 of the plate 74 are bent downwardly and are provided with elongated slots 77 receiving guide pins 78 attached to the side plates 18, 19. Attached to the plate 74 at a point between its ends is an arm 79 carrying a roller 80 which cooperates with a cam 81 fixed to the shaft 52. Formed on the end portions 76 of the plate are lugs 82 connected by springs 83 to stationary pins for holding the roller 80 in yielding engagement with the cam 81. The shape of the cam 81 is such as to move the gate 49 to its upper position for closing the discharge end of the chamber 20 until a card has been moved against the gate by the plate 48. The card is positioned at this time by the gate 49, the plate 48 and the end plates 71 so that each of the card index points may be engaged by the sensing devices mentioned above. After sensing has been completed, the gate 49 is lowered and the plate 48 is moved laterally to advance the card to a pair of feed rolls 86 which continue its advancement between guide plates 88 to succeeding pairs of feed rolls 89, 90 and 91. As each card is advanced from the feed rolls 91, its leading edge moves under an arm 92 pivoted at 93 to a stacker drum 94 rotatably supported by a shaft 95. A spring 96 holds the arm 92 in yielding engagement with the drum so that the card is carried therewith to a discharge hopper 97 where it is deposited.

*Driving mechanism*

For driving the card picker 10, the various feed rolls and cams mentioned above, and the drum 94 of the card stacker, there is provided a pulley 100 (Figs. 1 and 3) mounted loosely upon the shaft 52 and engaged by a belt 101 driven from a pulley 102 on the power shaft of a motor 103. Fixed to the pulley 100 for rotation therewith is a clutch plate 105 having a notch 106 in its periphery engageable by a dog 107 which is pivotally supported by a plate 108. Attached to one side of the plate 108, as by screws 109, is a gear 110 having a hub portion 111 which is connected, as by a pin 112, to the shaft 52. The dog 107 is provided with a projecting tail portion engageable by a latch 115 for holding the dog released from the notch 106 against the action of a spring 116 connecting the outer end of the dog to a projecting portion of the plate 108. The latch 115 is fixed to a pivoted armature 117 of a feed clutch magnet FC, and a spring 118 urges the armature about its pivot to engage the latch with the dog for holding the latter normally released from the notch 106. An arm 120 is pivotally supported by the armature 117 and is urged by a spring 121 to a position for engaging the back side of the tail portion on the dog so as to lock the plate 108 and the gear 110 against movement in either direction when the dog is released.

Figure 1:
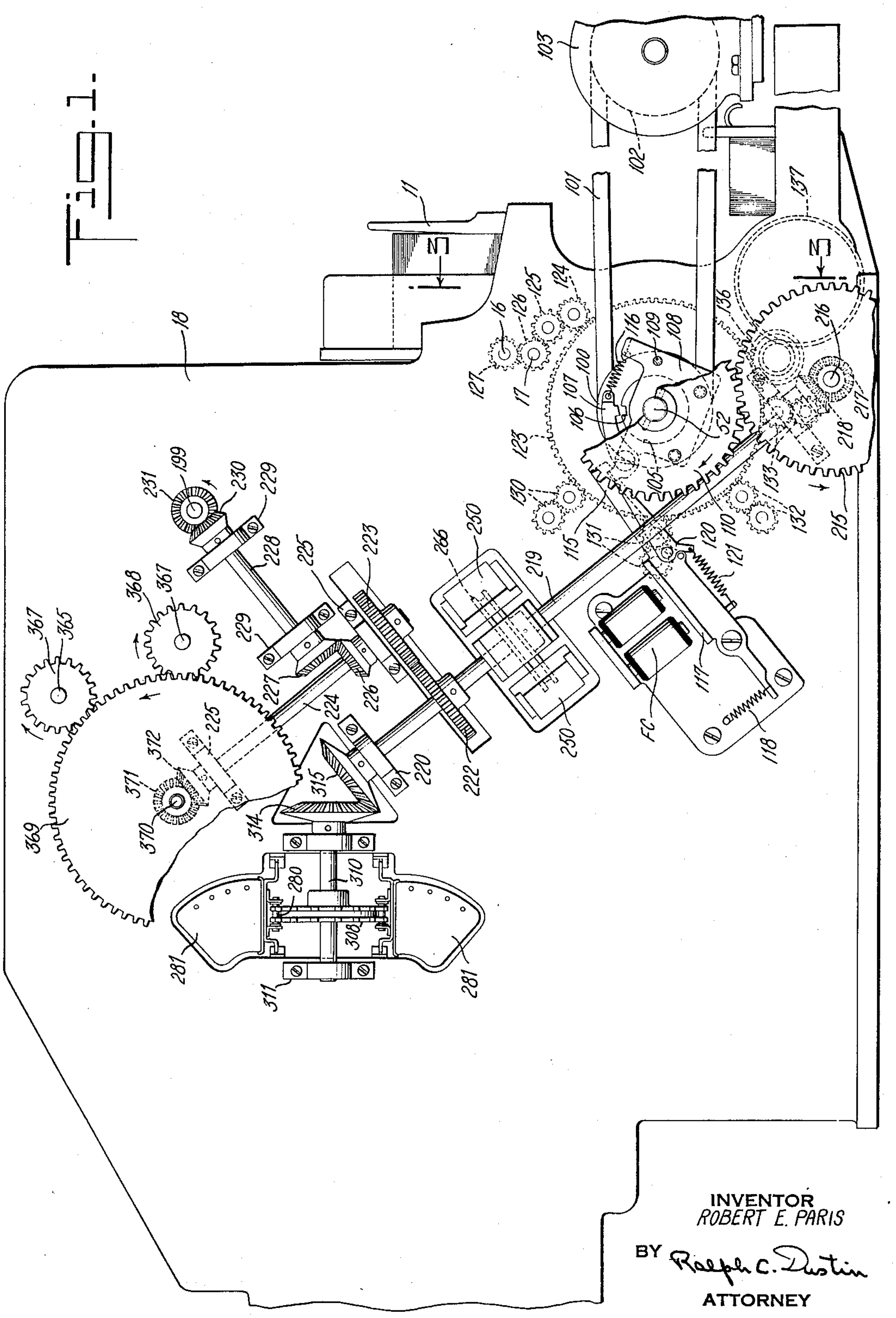
Fig. 1 is a side elevational view showing the drive mechanisms for different parts of the printing machine.

The pulley 100 is driven by the belt 101 in a clockwise direction in Fig. 1, and, when the feed clutch magnet FC is energized to engage the dog with the notch 106 in the clutch plate, the shaft 52 is also driven in a clockwise direction in Figs. 1 and 2. Connected to the right hand end of the shaft 52 in Fig. 3 is a gear 123 which meshes, as shown in Figs. 1 and 3, with a gear 124 operating through an idler gear 125 to drive a gear 126 fixed to the shaft 17 carrying the feed roll 15. Fixed to the shaft 16 is a gear 127 meshing with the gear 126 for driving the upper feed roll 14. Fixed to shafts carrying the feed rolls 86, 89, 90 and 91 are pairs of meshing gears 130, 131, 132 and 133 respectively, and the inner gear of each of these pairs meshes with the gear 123 for driving the feed rolls in a direction to advance the cards. For rotating the drum 94 of the card stacker, there is provided a gear 135 meshing with the gear 123 and carrying a gear 136 meshing with a gear 137 fixed to the drum. The oscillating of the picker 10 is effected by arms 139 pivotally connected to the picker and fixed to a shaft 140 rotatably supported by the side plates 18 and 19. An arm 141 is fixed to one end of the shaft 140 and is connected by a link 142 to a stud 143 eccentrically located on the gear 135.

*Card sensing and storage mechanisms*

Figure 16:
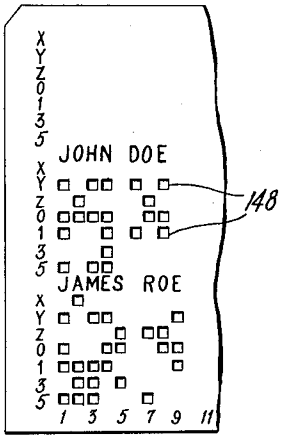
Fig. 16 is a plan view of a portion of a card with perforations therein.

Mechanisms have been shown herein constructed and arranged for sensing perforations in columns of seven index points formed in two decks of each card. As shown in Fig. 16, the cards are divided into three decks of columns having seven points in each designated as X, Y, Z, 0, 1, 3 and 5, but perforations 148 are formed in only the two lower decks. The cards are fed from the feed hopper 11 face down and with the No. 5 index points at the leading edge. Arranged above the card chamber 20, as shown in Figs. 2 and 3, are pins 150 extending between the arcuate plates 22 at points which are in line with the card index points of the two forward decks when the card is centered in the chamber by the mechanism described above. The pins 150 are divided into groups of seven, the pins of each group being arranged to cooperate with the index points of a card column. As shown in Fig. 3, the mechanism is designed for cards having sixty columns of points in each deck. In other words, there are sixty groups of seven pins 150 for each card deck. It will be appreciated that the mechanism could be designed as well for sensing perforations in three decks of columns, if desired, each deck having sixty columns, eighty columns, or any other number.

For supporting the pins 150 there is provided a pair of bars 151 (Figs. 2 and 4) connected at their ends by any suitable means, not shown, to the side plates 18, 19, and attached to the bars 151 is a plate 152 having openings through which reduced lower end portions 153 of the pins extend. The pins are formed from a thin metal plate, and the reduced portions 153 provide shoulders engageable with the plate 152 for supporting the pins normally in positions so that the ends of further reduced pin portions 154 are closely adjacent the upper surface of the card when positioned in the chamber 20. The upper ends of the pins extend freely through openings in a plate 156 (Fig. 4) supported by bars 157 which are attached at their ends to the side plates 18, 19.

Figure 4:
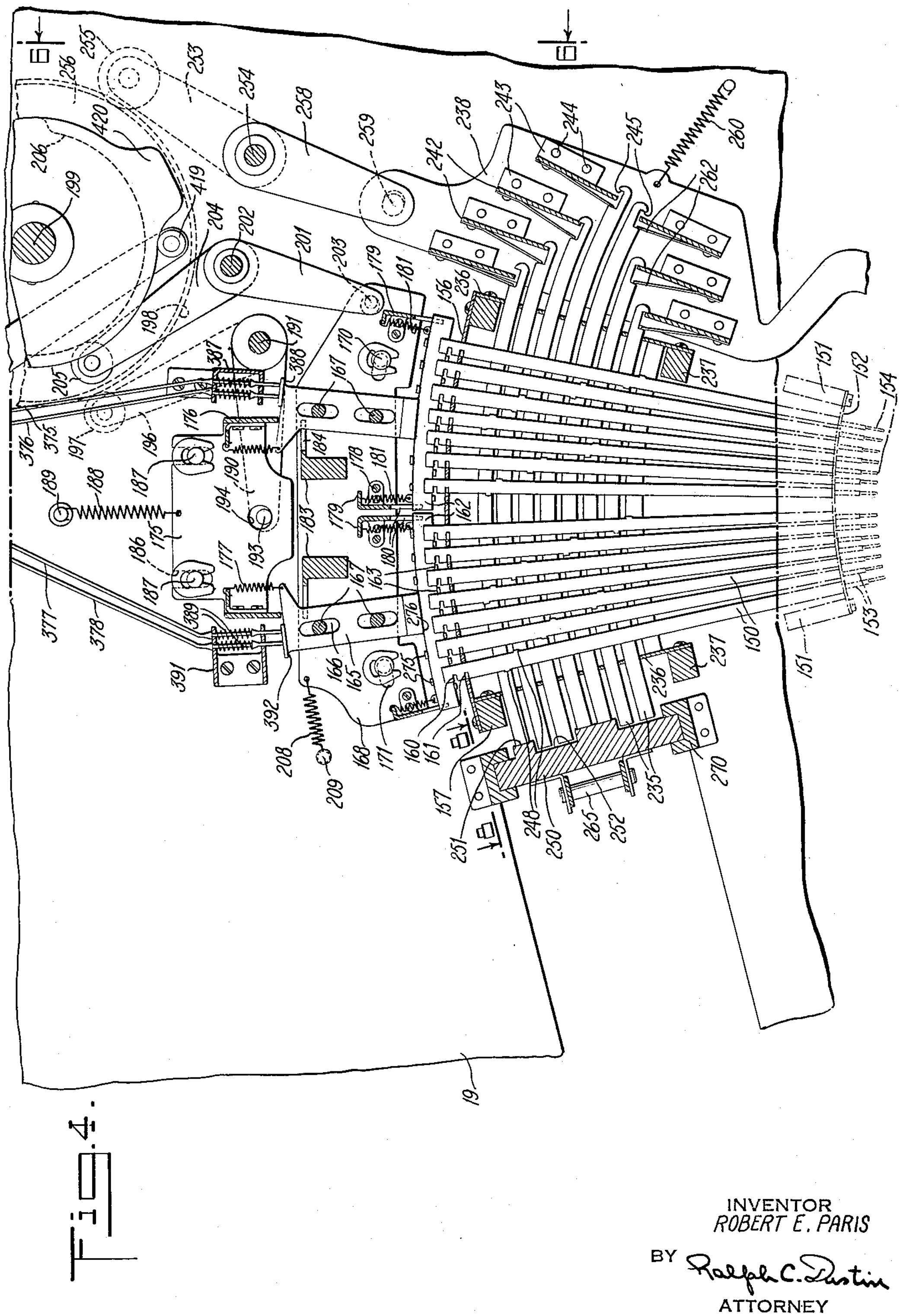
Fig. 4 is a view taken on the same plane as Fig. 2 but showing the card sensing and storage mechanisms.
Figure 6:
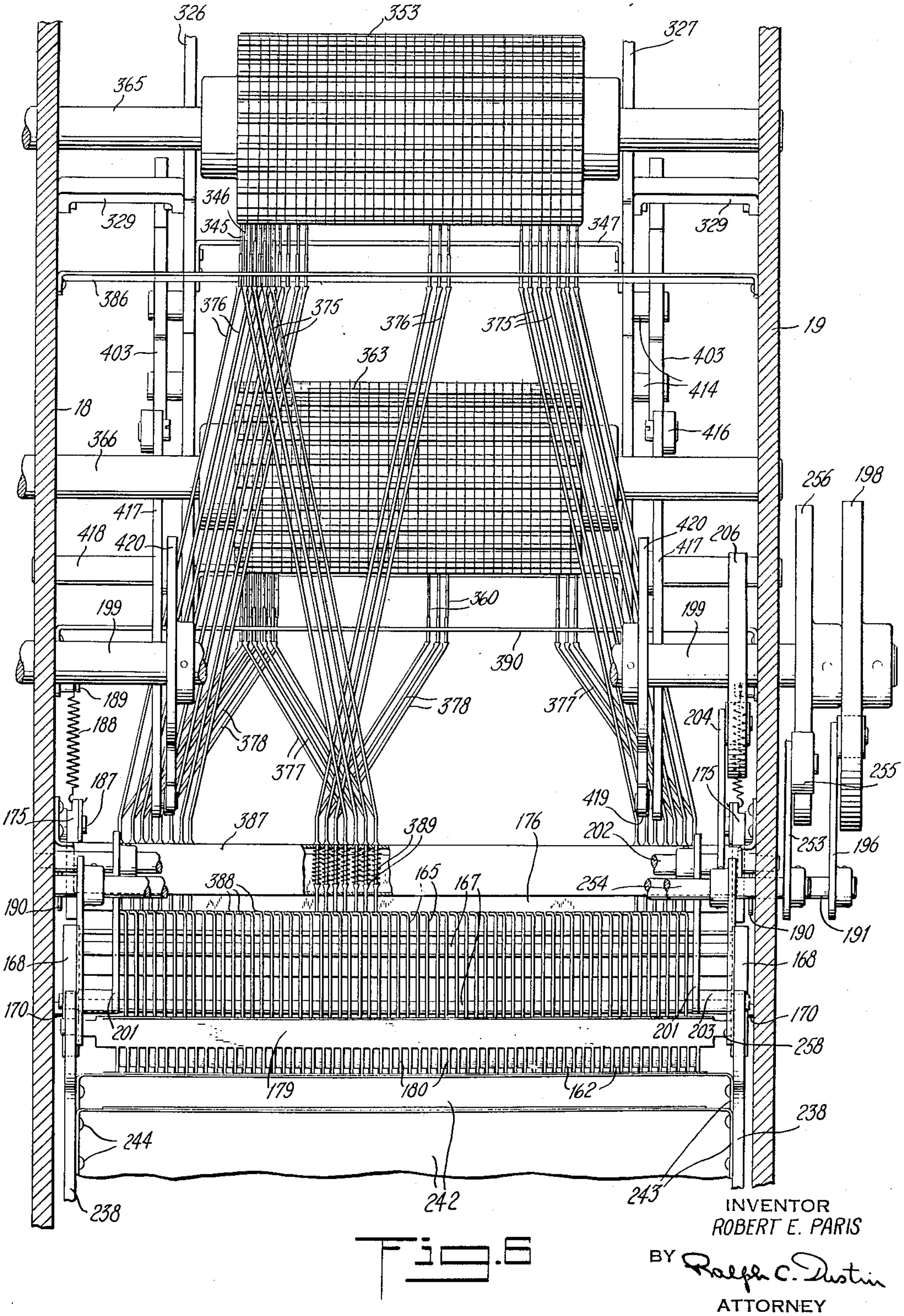
Fig. 6 is a vertical transverse section taken on the planes of the line 6—6 of Figs. 4 and 5.

Formed in one edge of each pin adjacent its upper end are two notches 160 and 161. Arranged at one side of the upper ends of each group of seven pins is a member 162 having lugs 163 along its lower edge adapted to be received in one or the other of the notches 160, 161. Each of the members 162 is connected at its mid-portion to an upwardly projecting member 165 having elongated slots 166 slidably receiving bars 167 which are connected, as shown in Figs. 4 and 6, to end plates 168. The slots 166 are formed so as to permit the connected members 162, 165 to move relative to the plates 168 in a direction extending radially of the arcuate card chamber 20. Fixed to the side plates 18, 19 are lugs 170 extending through slots 171 in the plates 168 adjacent their ends and supporting these plates for movement endwise in an arcuate path extending normal to the pins 150. It will be appreciated that the connected members 162, 165 for the different groups of pins will be moved simultaneously with the end plates 168 in an arcuate path, but the members for each group of pins may be moved separate of the others in a radial direction along the bars 167.

Arranged above the end plates 168 are plates 175 carrying bails 176 engageable with the upper ends of the members 165. Springs 177 are connected between lugs on the bails and projecting portions on the members 165 for urging the latter toward engagement with the bails. Extending between the end plates 168 and attached thereto, as by screws 178, are members 179 having comb portions 180 along their lower edges for guiding the radial movements of the members 162. Connected between lugs on the members 162 and 179 are springs 181 for urging the members 165 toward the bails 176. For guiding the upper ends of the members 165 there are provided bars 183 connected to the end plates 168 and having comb portions 184 engaging the sides of the members. The plates 175 are provided with notches 186 receiving lugs 187 on the side plates 18, 19 so that the plates are guided for movement in a vertical direction in Fig. 4. Each of the plates 175 is urged toward its raised position by a spring 188 connected to a lug 189 on one of the side plates, and arms 190 are fixed to a shaft 191 rotatably supported by the plates 18, 19 and are provided at their free ends with pins 193 extending through openings 194 in the plates 175 for positioning the latter against the action of the springs 188. For rocking the shaft 191 to position the plates 175 there is provided an arm 196 attached to one end of the shaft and carrying a roller 197 cooperating with a cam 198 fixed to a shaft 199. Lateral movement of the plates 168 is effected by arms 201 connected to a shaft 202 and having pins 203 extending through openings in the plates. The shaft 202 is rotatably supported by the side plates 18, 19 and has fixed to it an arm 204 carrying a roller 205 cooperating with a cam 206 on the shaft 199. A rocking of the arms 201 effects movement of the plates 168 against the action of springs 208 connected between the plates and lugs 209 on the side plates 18, 19.

For rotating the cam shaft 199 there is provided, as shown in Figs. 1 and 3, a gear 215 meshing with the gear 110 and fixed to a stub shaft 216 rotatably supported by the side plate 18. Mounted upon the stub shaft is a bevel gear 217 meshing with a bevel gear 218 on a shaft 219 rotatably supported by bearing members 220 attached to the side of the plate 18. Fixed to the shaft 219 is a gear 222 meshing with a gear 223 on a shaft 224 which is rotatably supported in bearings 225 attached to the side of the plate 18, and a bevel gear 226 on this shaft meshes with a bevel gear 227 carried by a shaft 228 supported in bearings 229. Another bevel gear 230 on the shaft 228 meshes with a bevel gear 231 attached to the shaft 199.

The cams 198 and 206 are shaped so as to hold the plates 175 and 168 in the positions shown in Fig. 4 while the arcuate plates 22, 23 are moved upwardly to effect a sensing of a card in the chamber 20 by the pins 150. Before sensing takes place, all of the pins 150 are supported in their lower positions by the plate 152, and the pin notches 160 are in line with the lugs 163 on the members 162. As the card is moved upwardly with the arcuate plates, all of the index points not perforated engage the end portions 154 of the pins and move the latter upwardly until the pin notches 161 are in line with the lugs 163. Those pins in line with perforations in the card remain in their lower positions. As soon as the pins are set up, the cam 206 operates to rock the arm 204 for moving the plates 168 to the right in Fig. 4 until the lugs 163 on the members 162 are received in the notches 160 or 161. Means are provided, as will be described shortly, for locking the pins against further outward movement until it is time to operate mechanisms for effecting a printing of the character represented by the setting of the pins. As soon as the pins are locked in place, the cam 198 operates to rock the arm 196 so that the plates 175 are lifted by the springs 188. It will be seen that the bails 176 will be moved upwardly with the plates 175 while the connected members 162, 165 remain in their lower positions due to the engagement of the lugs 163 with the notches 160, 161 in the pins.

*Pin locking mechanism*

Arranged at one side of the two groups of pins cooperating with corresponding columns in the perforated card decks, as shown in Fig. 4, are arcuate latches 235 slidably supported within openings formed in plates 236 which are connected at their upper ends to the cross bars 157 and are connected at their lower ends to similar bars 237. It will be understood that similar sets of latches are provided for the groups of pins sensing the index points in each of the columns. Adjacent the side plates 18, 19 are members 238 (Figs. 4 and 6) pivotally supported at their lower ends, as shown in Figs. 3 and 18, by the shaft 52. Extending between the members 238 are plates 242 having flange portions 243 at their ends connected, as by screws 244 to the members 238. The lower edges of the plates 242 extend into notches 245 in the latches and are adapted to engage the right hand ends of the notches for moving the latches longitudinally. It will be appreciated that a swinging of the members 238 about the shaft 52 will result in a moving of the plates 242 in arcuate paths extending normal to the pins 150 and longitudinally of the latches.

Figures 10, 11, 12:
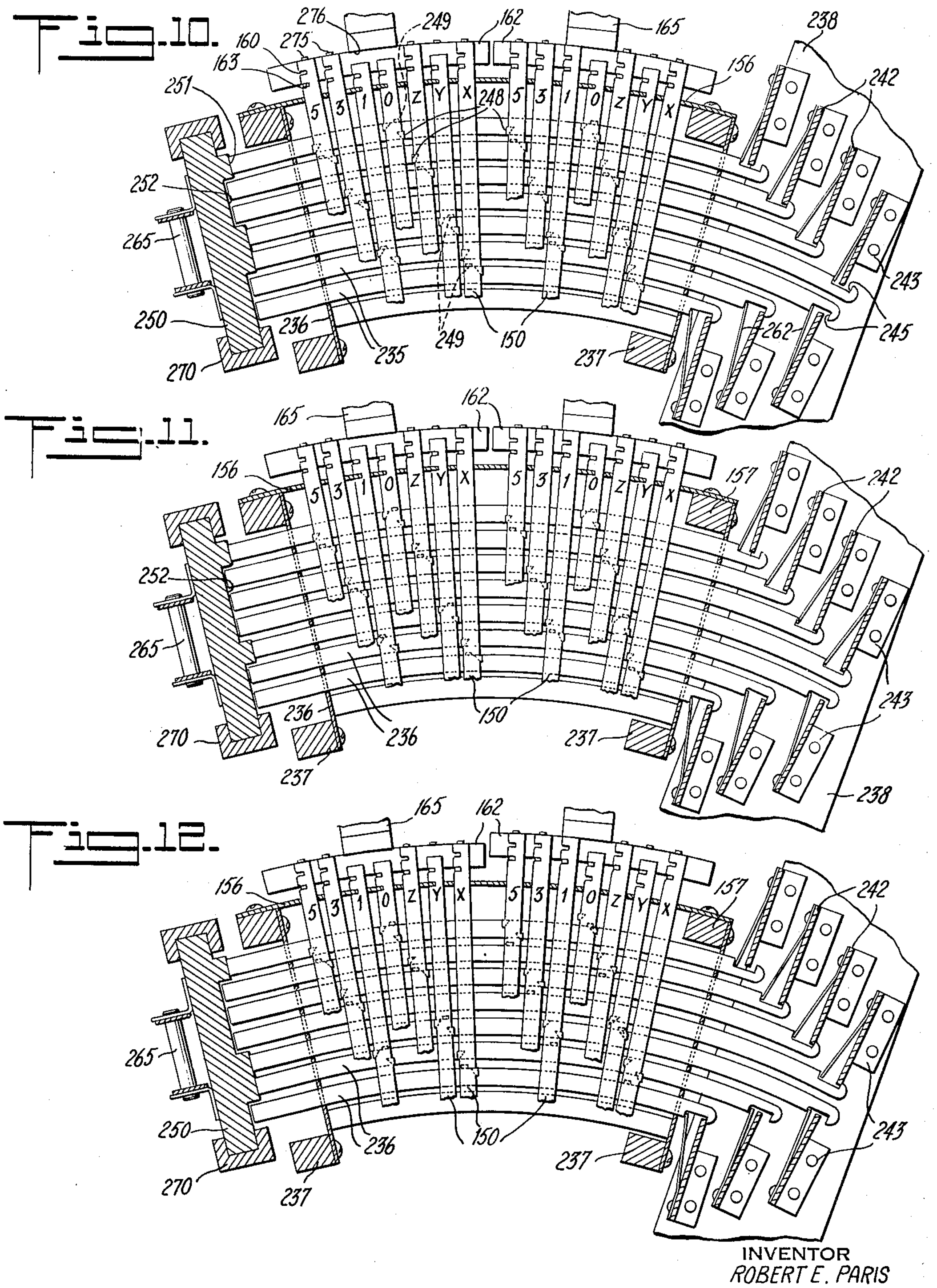
Figs. 10, 11 and 12 show two groups of pins controlled by one set of latches, the latches being in positions to lock both groups of pins in Fig. 10, being shifted to unlock one group of pins in Fig. 11, and being shifted again to unlock the other group of pins in Fig. 12.

Formed on each of the pins 150 are two lugs 248 extending toward the latches and adapted to cooperate, as shown in Figs. 10 to 12, with a lug 249 on one of the latches. The pins in each group have been designated as X, Y, Z, 0. 1, 3 and 5 in the order of their cooperation with the corresponding index points on the cards. It will be noted that the lugs 248 on the 0 pin of each group cooperate with the lug 249 on the uppermost latch. The lugs on the 5, Z, 3, Y, 1 and X pins cooperate with lugs on the 2nd, 3rd, 4th, 5th, 6th, and 7th latches, respectively, from the top. Each of the lugs 248 is provided with a flat upper surface adapted to engage a lug 249 for holding the pin against upward movement. The lugs 248 on each pin are located at opposite edges of the pin and are spaced longitudinally from each other a distance equal to the spacing between the pin notches 160, 161. The lug 249 on each latch may be positioned above the upper lug 248 at the left hand edge of the pin controlled thereby when the pin is in its lower position, and the pin is then held against movement upwardly. If the pin is in its raised position, the lug 249 cooperates with the lower lug 248 at the right hand edge of the pin for holding the latter against movement.

Circulated past the left hand ends of the latches, as shown in Figs. 4, 8, 10, 11 and 12 are permutation blocks 250 having high and low surfaces 251 and 252, respectively, adapted to cooperate with the ends of the latches for positioning the latter longitudinally. During the sensing of a card by the pins 150, the latches are held in positions out of engagement with the permutation blocks by the plate members 242. The lugs 249 on the latches are located at this time to the right of the pins controlled thereby so that the latter are free for upward movement. In order to move the plates 242 against the ends of the notches 245 for retracting the latches, there is provided, as shown in Figs. 4 and 6, an arm 253 connected to a shaft 254 and carrying a roller 255 cooperating with a cam 256 on the shaft 199. The shaft 254 is rotatably supported by the side plates 18, 19 and carries arms 258 having lugs 259 projecting through openings in the members 238. Springs 260 are connected between the members 238 and stationary abutments for urging them against the action of the arms 258 in a direction to retract the latches. Connected to the plates 242 are bowed springs 262 extending into the notches 245 and engaging the left hand edges of the latter for urging the latches toward the permutation blocks 250.

Figure 8:
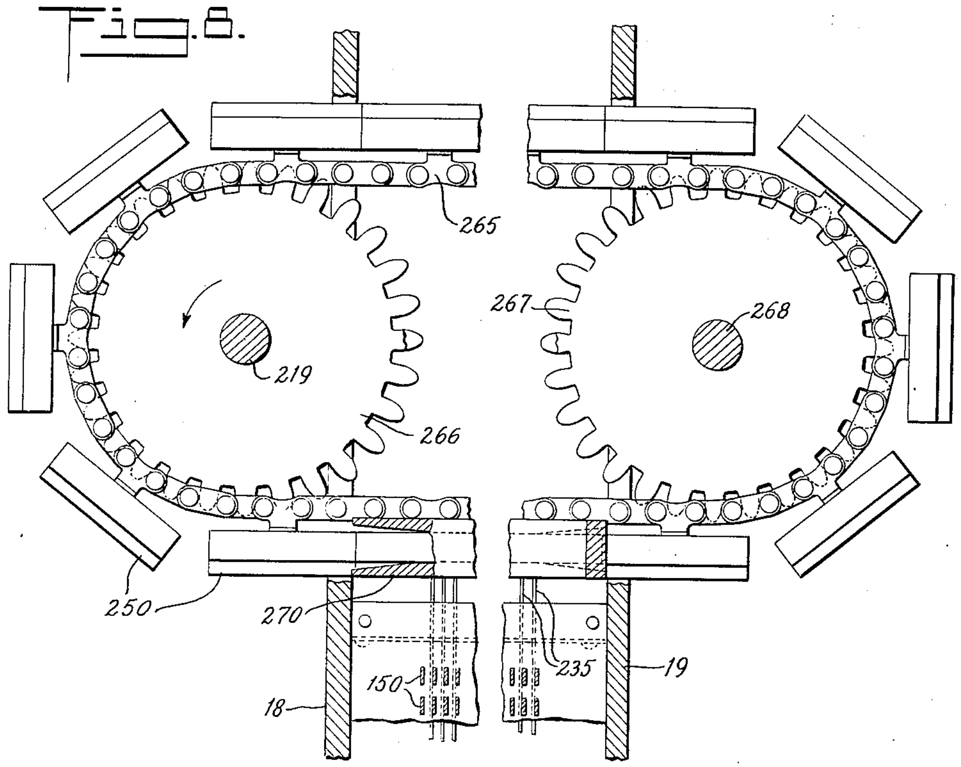
Fig. 8 is a view showing the permutation blocks mounted on a chain passing about sprocket wheels, this view being taken on the plane of the line 8—8 of Fig. 4.
Figure 13:
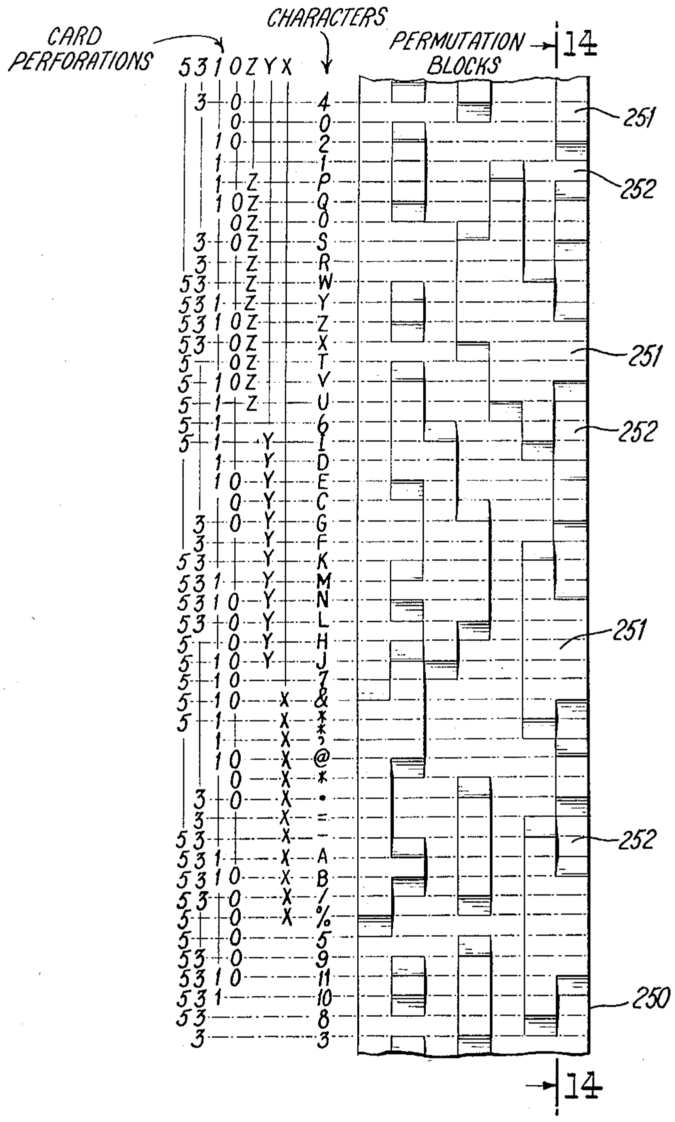
Fig. 13 is an enlarged face view of permutation blocks with the combinations of surfaces for one complete sequence of characters, and included with the blocks is a chart indicating the card perforations corresponding to the surface combinations as well as the characters represented by the perforations and surface combinations.
Figure 14:
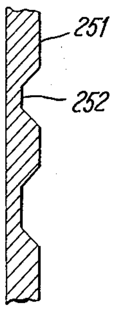
Fig. 14 is a fragmentary sectional view taken on the plane of the line 14—14 of Fig. 13.
Figure 15:
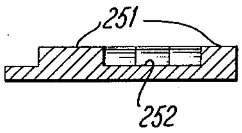
Fig. 15 is a transverse section through the permutation blocks at the point of the letter E.

The permutation blocks are attached to links of a chain 265 engaging, as shown in Figs. 1 and 8, sprockets 266 and 267 which are connected, respectively, to the driven shaft 219 and a shaft 268 rotatably supported in bearings carried by the side plate 19. Connected between the side plates are guide members 270 for guiding the blocks in a straight path as they pass the ends of the latches. The blocks are arranged on the chain so that their adjacent ends abut each other as they pass through the guide members to provide continuous surfaces engageable by the ends of the latches. The surfaces on the blocks passing the latches are shaped, as shown in Figs. 13, 14 and 15, so that different combinations of high and low surfaces are presented to the latches for the different characters to be printed. All of the characters to be printed and the combinations of high and low surfaces on the blocks representative of these characters are shown in Fig. 13. The row of surfaces at the right hand edges of the blocks in Fig. 13 cooperate with the uppermost latches in Fig. 4 and the chain 265 is circulated so that the combinations of surfaces progressing from the bottom to the top of Fig. 13 are presented successively to the latches. When the latches engage low surfaces on the blocks, the lugs 249 are in line with the lugs 248 at the left hand edges of the pins controlled thereby. When high surfaces are moved into line with the latches, the lugs 249 are then positioned over the lugs 248 at the right hand edges of the pins.

Referring to Figs. 10, 11 and 12 it will be noted that the pins 150 for the left hand group have been set up for the letter E while the pins for the right hand group have been set up for the letter C. The members 162 have been moved to the right so that their lugs 163 are in the pin notches 160, 161 for locking each group of pins and its member 162 together as a unit. The permutation blocks are in positions in Fig. 10 to present to the ends of the latches the combination of high and low surfaces representative of the letter G. At this time the latches are in such positions that at least one of the lugs 248 on a pin in each of the groups is engaged by the lug 249 on one of the latches so that both groups of pins are held against outward movement. It will be noted that the left hand group of pins is held by lugs 248 on pins 1 and 3 engaging lugs 249 on the latches. The right hand group of pins is held only by a lug 248 on pin No. 3 engaging a lug 249. As shown by Fig. 13, the next combination of surfaces engaging the latches on advancement of the permutation blocks is that representative of the letter C. The latches are shown in Fig. 11 set up by the C combination of surfaces. At this time the left hand group of pins is held by engagement of a lug 248 on pin No. 1 with a lug 249 on a latch, but the right hand group of pins, which has been set up for the letter C, has none of its lugs 248 in engagement with lugs 249 and so is unlocked for outward movement. The member 162 connected to the right hand group of pins by the lugs 163 is then free for outward movement by the springs 181 until its connected member 165 engages the bail 176. The outward movement is sufficient to remove the lugs 248 on the pins from the paths of the lugs 249 on the reciprocating latches, as shown in Fig. 12. Further advancement of the permutation blocks brings the combination of surfaces representative of the letter E opposite the ends of the latches and positions them for unlocking all of the pins in the left hand group so that the connected members 162, 165 may be moved outwardly. As the permutation blocks pass the latches for other groups of pins, an unlocking of the pins takes place if they are set up for a character corresponding to that represented by the combination of surfaces engaging the latches which control the pins. Any other combination of surfaces will hold the pins in their locked positions. By the time all of the combinations of surfaces have passed each set of latches, an unlocking of all the pin groups set up for the printing of characters will have taken place. To assure that each set of latches has been subjected to each combination of surfaces, the latches are held by the springs 262 against the permutation blocks until the surface combinations for one complete set of characters and a few of another set have passed each set of latches. The blocks may be connected along the full length of the chain to provide a continuous repetition of shaped surfaces passing the latches, but this is not necessary because certain blocks will be passing the latches while they are retracted during the sensing of cards.

The upward movement of the connected members 162, 165 effects the operation of mechanisms, shortly to be described, for printing the characters represented by the setting of the pins. As soon as all the groups of pins set up have been unlocked, the cam 256 rocks the arm 253 to permit the members 238 to be moved by the springs 260 for retracting the latches. Following this, the cam 206 rocks the arm 204 for effecting movement of the plates 168 in a direction to remove the lugs 163 from the pin notches 160, 161. The cam 198 operates at this time to move the plates 175 with the bails 176 downwardly so as to engage lugs 275 along the upper edges of the members 162, and a shoulder 276 at the lower end of each member 165, with the upper ends of the pins for moving the latter positively to their lower positions. After the pins have been moved downwardly until the shoulders near their lower ends engage the plate 152, the cam 198 operates to lift the plates 175 and the bails 176 until the lugs 163 are again opposite the pin notches 160.

*Type carriers*

Figure 17:
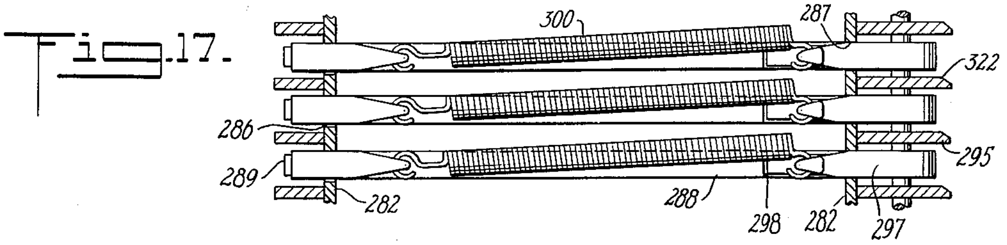
Fig. 17 is an enlarged plan view of several type bars with control means therefor.

Connected to links of a chain 280, as shown in Figs. 1, 5, 7, and 9, are type carriers 281, each comprising a pair of arcuate plates 282 having flange portions 283 connected to a base plate 284. Extending radially through openings 286, 287 (Fig. 17) in the plates 282 are type bars 288 which are adapted to be moved longitudinally for engaging type elements 289 carried thereby with an inked ribbon 290 and a sheet of paper 291 passing over a platen 292. As shown herein, the type bars of each carrier are arranged in rows vertical to the base plate 284, and four bars are provided in each row extending normal to the platen 292. Ten rows of bars have been shown mounted on each carrier but it is not necessary that they be limited to this number. Arranged upon the plates 282 between adjacent rows of type bars are frames 295 having notches in their upper corners receiving the upper edges of the plates, and formed on the frames are lugs 296 projecting through openings in the plates so that the frames are held against lateral displacement. Pivotally mounted upon the frames are latches 297 adapted to be received within notches 298 in the type bars for limiting movement of the latter to the right in Fig. 5. The openings 287 in the plate 282 adjacent the latches are only wide enough to provide a sliding fit for the type bars, but the openings 286 in the other plate are wide enough to permit some lateral movement of the forward ends of the bars. Springs 300 are connected between the type bars and the latches for urging the bars toward their retracted positions and, at the same time, urging the latches toward engagement with the notches 298. As shown in Fig. 17, each spring is connected between a type bar and a latch so as to hold the forward end of the bar in yielding engagement with the edge of the opening 286 at the advancing side of the carrier. This permits the type end of the bar to pivot during printing so that it remains stationary relative to the ribbon and prevents blurring of the printed characters.

Figure 7:
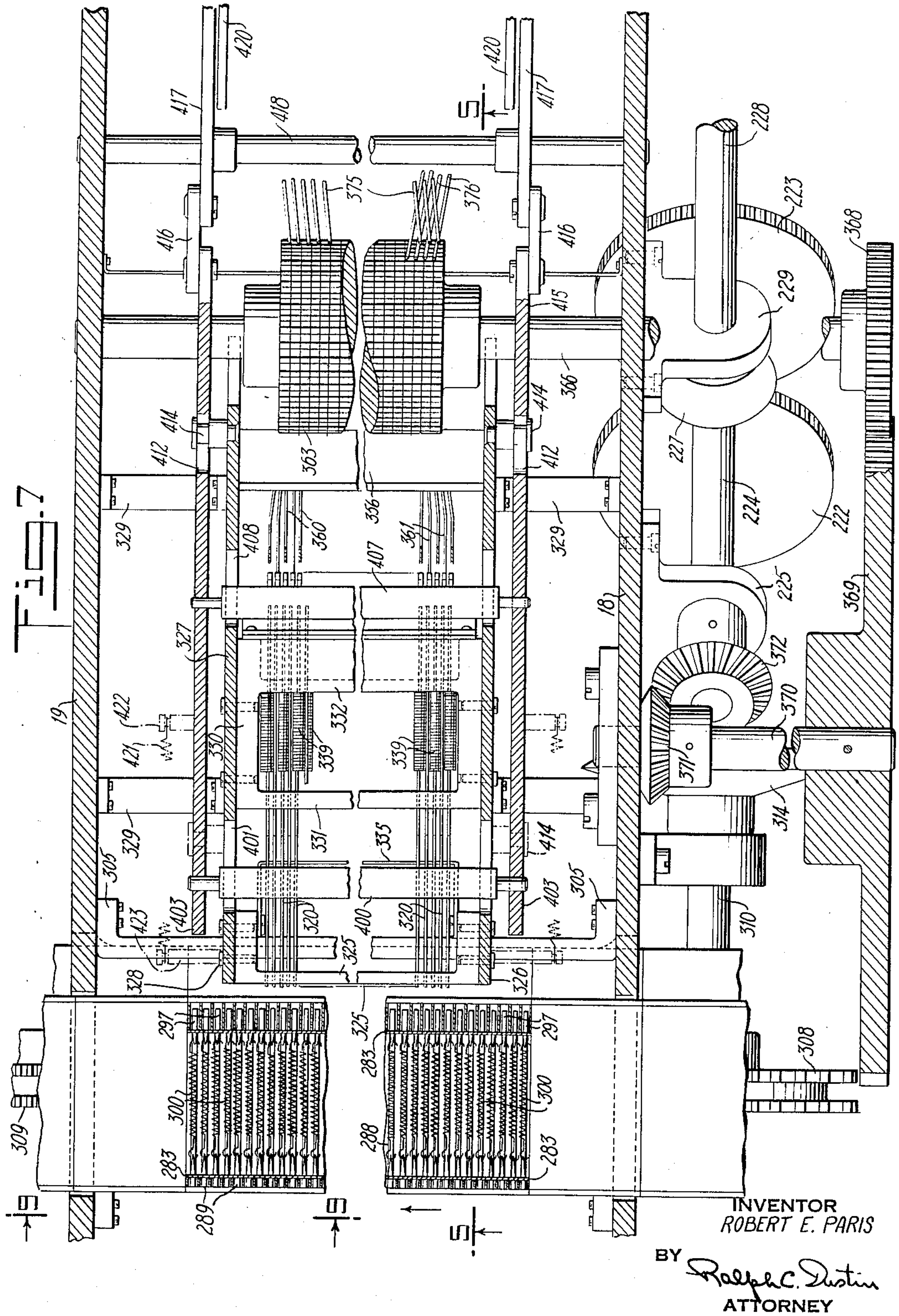
Fig. 7 is a sectional view taken on the planes of the line 7—7 of Fig. 5 with the central portion broken away.

The base plate of each carrier is connected to a member 304 having end portions slidably received within guideways formed in members 305 extending between the side plates 18, 19 and connected to the latter, as by screws 306. Brackets 307 connect the member 304 to links of the chain 280 which passes about sprocket wheels 308, 309 on shafts 310 rotatably supported by bearings 311 attached to the outer sides of the plates 18, 19. The shaft for the wheel 308 carries, as shown in Figs. 1 and 7, a bevel gear 314 meshing with a bevel gear 315 on the driven shaft 219 for effecting rotation of the wheel to advance the type carriers in the direction indicated by the arrow. The type carriers are driven in such a way that the type bars 288 are moved past the ends of hammers 320 in synchronism with the movement of the permutation blocks past the latches for the sensing pins which control mechanisms shortly to be described, effecting operation of the hammers. In other words, a combination of surfaces on the blocks representing any one of the characters comes into position for engagement by a set of latches at the same time that a type bar carrying a type element for printing the same character comes into position for engagement by the hammer controlled by the latches. Actually, the type bars are moved into line with the hammers just after the surfaces on the permutation blocks are engaged by the latches so as to provide time for operations of the hammer mechanisms. As one of the hammers is released, it strikes a tail portion 321 on one of the latches 297 and effects a release of the latter from the notch 298 as well as a driving of the latch against the end of the type bar for impelling it toward the platen. The frames 295 between the latches and the adjacent vertical rows of type bars prevent the hammers from engaging any latches other than those intended. Each of the frames has a beveled surface 322 (Fig. 17) for camming the hammers away from the type bars as the carriers advance.

*Hammer mechanisms*

Figure 5:
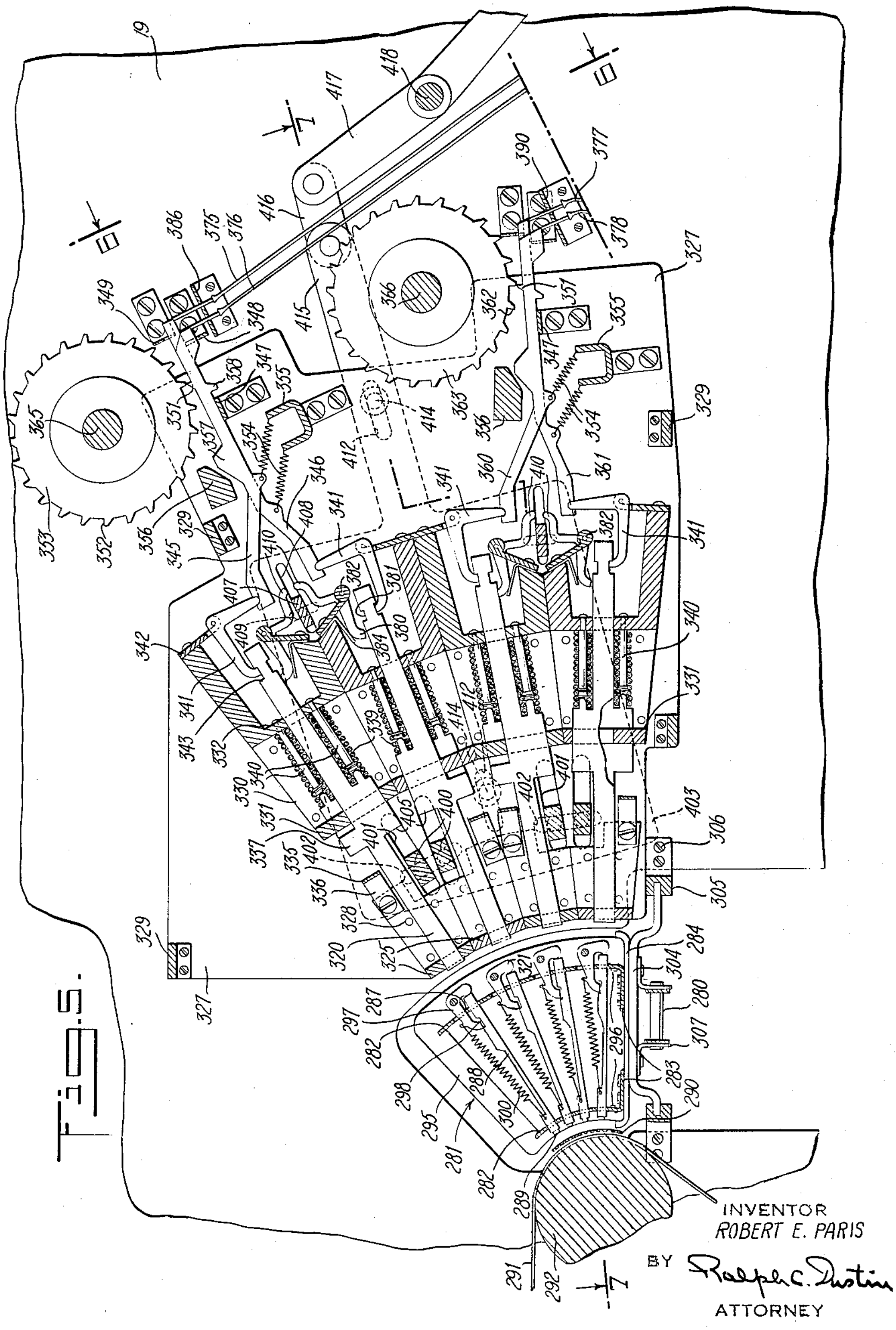
Fig. 5 is a vertical section taken on the plane of the line 5—5 of Fig. 7 and showing type bars mounted upon a carrier, hammer mechanisms operable to engage the type bars, and means for controlling the operation of the hammer mechanisms.

Referring to Figs. 5 and 7 it will be noted that the hammers 320 are arranged in vertical rows with four hammers in each row, and they are supported for movement longitudinally in paths extending radially of the platen 292 and in alignment with the type bars 288. The supporting means comprises front bearing plates 325 extending between supporting plates 326, 327 and having flange portions at their ends connected to the supporting plates by screws 328. One bearing plate is provided for the top hammers in all of the vertical rows, another for the hammers next to the top in all rows, and two others for the third and fourth hammers, respectively, in all rows. The supporting plates 326, 327 are spaced inwardly from the side plates 18, 19 and are held in fixed positions by brackets 329 connecting them to the side plates. Bearing members 330 are connected between the supporting plates and are provided with plate portions 331, 332 having openings within which the central and right hand portions of the hammers are slidably received. A separate bearing member is provided for each of the horizontal rows of hammers the same as the front bearing plates. Extending substantially parallel to each of the front bearing plates is a stop bar 335 having flange portions 336 at its ends connected with the flanges of the front bearing plates to the supporting plates 326, 327. Projecting laterally from each of the hammers is a portion 337 adapted to engage one of the stop bars for limiting movement of the hammer toward the type bars. The hammer is stopped after the latch 297 is actuated and before the type element on the bar impelled thereby engages the ribbon with the paper.

For moving the hammers toward the type bars there is provided for each hammer a helical spring 339 acting between the plate portion 332 of a rear bearing member and a shoulder on the hammer. A rod 340 is supported by the plate portion 332 and extends through the spring for holding the latter in place. As indicated in Figs. 5 and 7, the springs for adjacent hammers in the same horizontal rows are located at opposite sides of the hammers so that the latter may be spaced closely without interference by the springs. Pawls 341 are pivotally supported by comb shaped members 342 attached to the bearing members and are engageable with notches 343 in the hammers for holding the latter in cocked positions against the action of the springs 339. Pivotally engaging the pawls for the two upper hammers in each vertical row are interposers 345, 346 which normally rest upon a cross bar 347 and are guided at their rear ends for longitudinal movement by comb shaped members 348, 349 attached to the side plates 18, 19. The interposers are spaced laterally from each other on the cross bar, the interposer 345 being shown in front in Fig. 5 and engaging the pawl for the top hammer, while the interposer 346 is spaced in back of the interposer 345 and engages the pawl for the next lower hammer. The left hand portions of the interposers are bent toward each other so as to engage the vertically aligned pawls. Formed on each of the interposers is a tooth 351 engageable with any one of a plurality of teeth 352 projecting from the periphery of a circular disc 353. Springs 354 connected between the interposers and a stationary cross member 355 normally hold the interposers against the cross bar 347 and in positions to the right for engaging the pawls with the notches in the hammers.

When the right hand end of an interposer is raised, the tooth 351 is engaged by one of the teeth 352 to effect a movement of the interposer to the left until a cam 356 is engaged by a projecting portion 357 on the interposer for camming the latter downwardly against the cross bar 347 and disengaging the teeth 351, 352. The movement of the interposer to the left rocks the pawl 341 to release the hammer for striking one of the type bars. As soon as the tooth 351 is disengaged from one of the teeth 352, the spring 354 moves the interposer to the right until the pawl engages the side of the hammer. At the lower side of each interposer is a tooth 358 engageable with the cross bar 347 for limiting the forward throw of the interposer.

The pawls for the two lower hammers in each vertical row are controlled by interposers 360, 361 which are like those already described. These interposers have their teeth 351 engageable by any one of a plurality of teeth 362 on a circular disc 363, and they are normally held by springs 354 against a cross bar 347 in positions for engaging the pawls with the hammers.

The circular discs 353 and 363 are fixed to shafts 365, 366, respectively, rotatively supported by the side plates 18, 19. Connected to these shafts, as shown in Figs. 1 and 7, are gears 367, 368 meshing with a gear 369 on a shaft 370 which carries a bevel gear 371 meshing with a bevel gear 372 on the shaft 224 driven from the motor 103, as described above. The driving connections are such that the circular discs are rotated continuously in a clockwise direction in Fig. 5.

For each vertical row of hammers there is provided a pair of interposers 345, 346 controlling the two upper hammers and a pair of interposers 360, 361 controlling the two lower hammmers. Each pair of interposers 345, 346 has its teeth 351 cooperating with teeth 352 on a separate disc 353, and each pair of interposers 360, 361 has its teeth cooperating with teeth on a separate disc 363. In other words, one pair of interposers 345, 346 has its teeth engageable with the same teeth on one disc, while the next horizontally adjacent pair of interposers has its teeth engageable with the same teeth on another disc. This is also true of the interposers 360, 361. The discs may be adjusted angularly relative to each other so that the interposers are actuated at the proper times for releasing the hammers to engage the type bars. Each of the interposers 346 extends at its right hand end, as shown in Fig. 5, a short distance beyond the ends of the interposers 345 so that it may be engaged by an actuating rod or wire 375, and the right hand end of each interposer 345 has a depending portion which is engaged by an actuating rod or wire 376. The right hand ends of the interposers 360, 361 are shaped in a similar manner for engagement by rods or wires 377 and 378. The arrangement of these rods or wires will be described shortly.

Upon the release of a hammer by one of the pawls 341, the spring 339 operates to throw the hammer against the tail portions 321 of a latch 297 for releasing the latter and moving the type bar toward the platen. Before the type bar forces the ribbon and paper against the platen, the projecting portion 337 on the hammer engages the stop bar 335 and causes the hammer to rebound. In order to prevent the hammer from rebounding and compressing the spring 339 until it is thrown again toward the latch 297, there is provided a pawl 380 engageable with a notch 381 in the hammer for holding the latter in a forward postion just free of the type carrier. The pawls 380 are pivotally supported by comb shaped members 382 connected to the bearing members 330, and spring elements 384 are also connected to the bearing members and act on the pawls 380 for holding the latter in yielding engagement with the hammers.

*Interposer actuating mechanisms*

As shown in Figs. 4, 5, 6 and 7, the rods or wires 375, 376 extend at their upper ends through openings in a plate 386 connected to the side plates 18, 19, and the lower ends of these wires extend through openings in opposite legs of a U-shaped member 387 connected to the side plates. Each of these wires rests at its lower end upon a flange 388 formed on one of the members 165 controlled by the groups of pins 150 sensing holes in the second deck of the card. Springs 389 act between the U-shaped member 387 and collars on the wires for holding the latter in engagement with the flanges 388. The wires 377, 378 are guided at their upper ends in openings formed in a plate 390 connected to the sides plates 18, 19, and are guided at their lower ends in openings formed in a member 391. The lower ends of the wires 377, 378 are held by springs 389 against flanges 392 formed on the members 165 controlled by the groups of pins sensing holes in the first deck of the card.

The wires are arranged herein, as shown in Fig. 6, so that the groups of pins sensing the first twenty-three columns of index points in the upper deck of Fig. 16 (this is the second deck when the card is in sensing position) determine the actuation of wires 376 to effect printing by the top type bars in each of the first twenty-three vertical rows. All of the wires have not been shown in Fig. 6, but a few of the first and last wires of each group have been shown. The wires 375 cooperate with the members 165 controlled by the groups of pins sensing the index points in columns twenty-four to sixty of the top deck in Fig. 16. In a similar manner, the wires 378 cooperate with the members 165 controlled by the groups of pins sensing the index points in the first twenty-three columns of the bottom deck in Fig. 16, and the wires 377 cooperate with the members controlled by the groups of pins sensing the index points in the last thirty-seven columns of the bottom deck in Fig. 16. It will be appreciated that this arrangement makes it possible to obtain a maximum printing of twenty-three characters in the first and third lines, and thirty-seven characters in the second and fourth lines. The wires 375 engage the flanges 388 at points spaced outwardly from the wires 376 so they may be passed across the wires 376 to engage the outer ends of the longer interposers 346. The same thing is true for the wires 377. It will be appreciated that the wires may be arranged in any desired manner between the members 165 and the interposers to obtain a printing of other numbers of characters on the different lines. For instance, the number of wires 376 may be increased to effect a printing of a larger number of characters on the first line, but the number of wires 375 would have to be decreased by a corresponding amount. The maximum number of characters that could be printed in either the first two or the last two lines with the mechanism shown is sixty.

Figure 9:
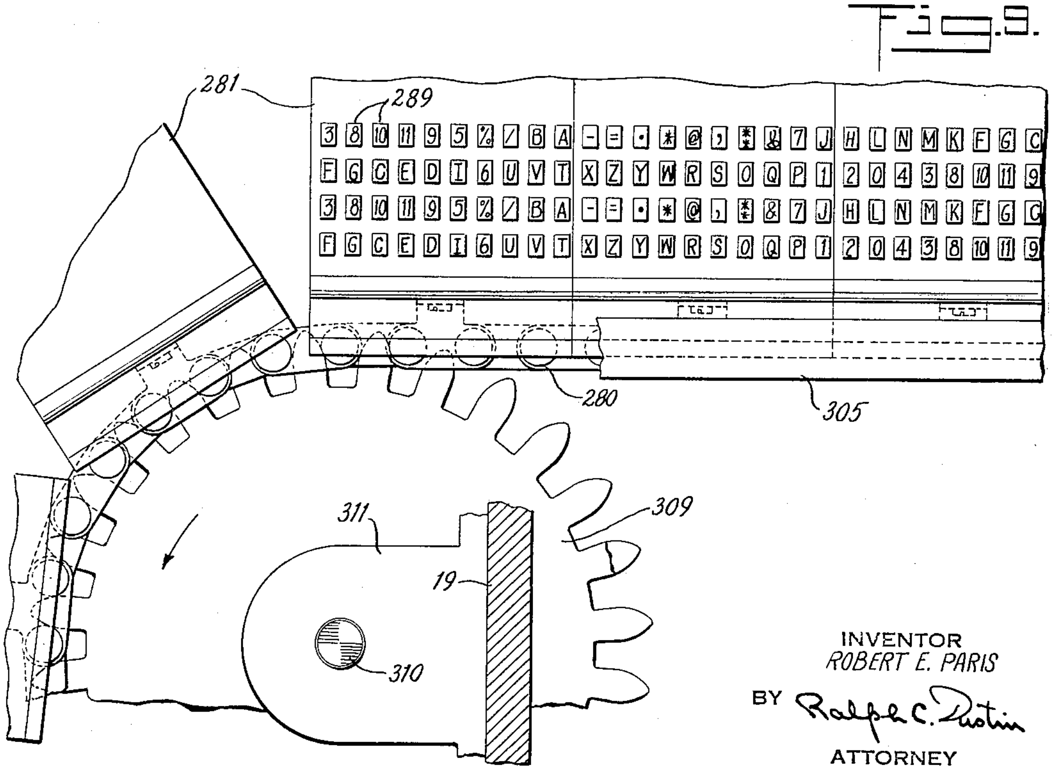
Fig. 9 is an enlarged front elevational view of several type carriers with the feeding means therefor, this view being taken on the line 9—9 of Fig. 7 but showing the characters as they appear when printed.

With the arrangement of wires shown, the type bars must be arranged on their carriers in the order shown in Fig. 9. Assuming that the permutation blocks are in position to present the combination of surfaces representing the digit 3 to the latches controlling the groups of pins sensing the first column in both decks of the card, then the type bars in the first and third horizontal rows must come into position for engagement by the first hammers in these rows, and these type bars must be capable of printing the digit 3. As the permutation blocks move to present this same combination of surfaces successively to the latches controlling the groups of pins reading the other card columns up to the twenty-third, the same type bars in the first and third rows must move successively to positions for engagement by the hammers in the positions corresponding to the card columns. When the permutation blocks reach a position to present this combination of surfaces to the latches controlling the groups of pins sensing the twenty-fourth columns of the two decks, the type bars in the second and fourth rows bearing elements for printing the character 3 must come into position for engagement by the first hammer in each of these rows. All of the type bars in the second and fourth rows must be displaced twenty-three positions from the same bars in the first and third rows. If the wires were arranged for printing different numbers of characters in the lines, then the type bars must be located on the carriers so that the displacements for the second and fourth rows are equal to the number of characters to be printed in the first and third rows, respectively.

It will be seen that one passing of each of the different surface combinations on the permutation blocks past the latches will result in a complete printing of all four lines since the type bars for printing all of the characters will have passed the hammers during the same period. As soon as four lines have been printed, suitable means, not shown, operate to feed the paper so that it may be printed upon in four more lines. The wires may be arranged, if desired, to obtain printing in any one of the four lines alone or in any combination of lines. The paper feeding means may be made adjustable to advance the paper different amounts so that printing may be obtained in the proper places if less than four lines are to be printed from the reading of a single card.

*Hammer restoring mechanisms*

After a card has been sensed and the hammers corresponding to the groups of pins set up have been released, it is necessary that the hammers be returned again to their cocked positions. To accomplish this there are provided, as shown in Figs. 5 and 7, four bails 400 extending through slots 401 in the stationary plates 326, 327 and slidably guided at their ends in slots 402 formed in plates 403. The slots 401 extend radially for guiding the bails in paths parallel to the axes of the hammers, and the slots 402 extend substantially normal to the slots 401 so that the bails 400 may move in the slots 401 upon movement of the plates 403 in a straight path. Formed on the hammers are shoulders 405 engageable by the bails for moving the hammers to the right against the action of the springs 339.

Before the hammers can be moved toward their cocked positions, is is necessary that the pawls 380 be lifted from the notches 381 in the hammers. This is accomplished by bails 407 extending through radial slots 408 in the plates 326, 327 and slidably guided at their ends in slots 409 formed in the plates 403 and extending substantially normal to the slots 408. Upon movement of the plates 403 to the right in Fig. 5, the bails 407 slide in the slots 408 and engage tail portions 410 on the pawls 380 for rocking the latter out of the notches 381. Engagement between the bails 407 and the tail portions 410 takes place before the bails 400 engage the shoulders 405 on the hammers. When the hammers have been returned to their full cocked positions, the pawls 341 drop into the notches 343 and hold the hammers in place.

The plates 403 are provided with slots 412 slidably receiving lugs 414 extending from the outer sides of the fixed plates 326, 327. The arrangement of these lugs and slots is such that the plates are guided for movement in a path perpendicular to the platen midway between the top and bottom hammers. At the right hand ends of the plates 403 are elongated portions 415 which are connected by links 416 to levers 417 pivotally supported by a shaft 418 and carrying rollers 419 (Figs. 4 and 6) engageable with cams 420 on the shaft 199. These cams operate to move the bails 400 once during each machine cycle in a direction to retract the hammers and then to positions in advance of the hammers so that they may be released for engaging the type bars. The plates 403 are yieldingly urged to the left by springs 421 (Fig. 7) connected between lugs 422 projecting from the plates 403, and lugs 423 projecting from the plates 326, 327.

*Wiring diagram*

Figure 20:
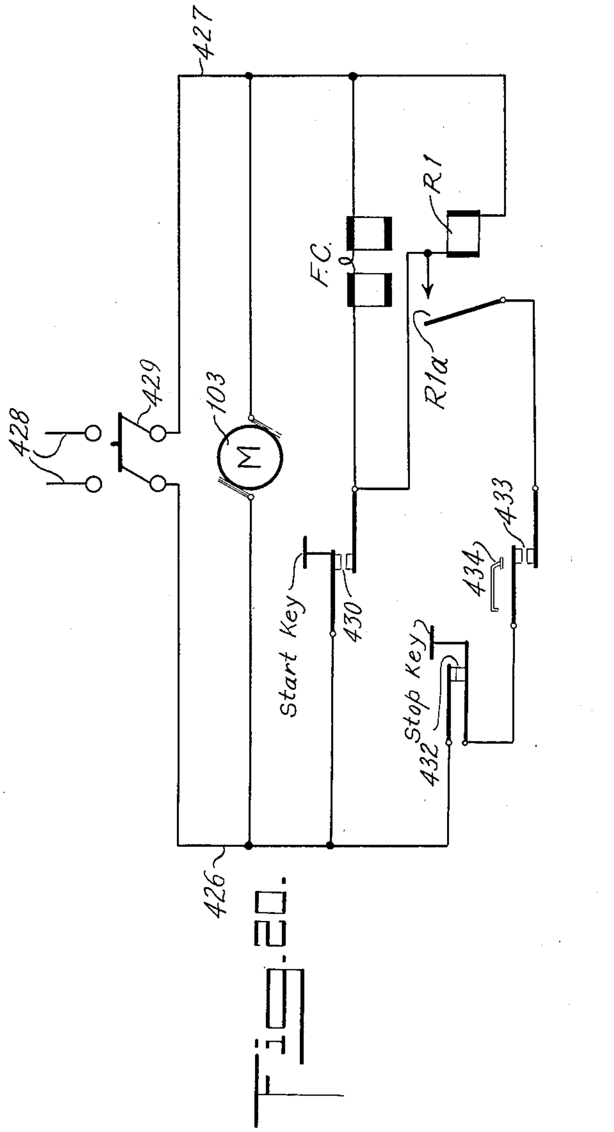
Fig. 20 is a wiring diagram.

As shown in Fig. 20, the motor 103 is connected directly to conductors 426, 427 which are energized from a power line 428 on the closing of a switch 429, and the motor operates continuously when this switch is closed. The feed clutch magnet FC is connected with normally open contacts 430 in a circuit between the conductors 426, 427, and a Start Key is adapted to be operated manually for closing the contacts 430 to energize the magnet. A relay R1 is connected in parallel with the feed clutch magnet so that it is energized on the closing of the contacts 430, and relay contacts R1*a* are connected in a circuit including normally closed contacts 432, normally open contacts 433 and the winding of the relay R1. A Stop Key is arranged to be operated manually for opening the contacts 432, and a lever 434 is adapted to be actuated by a card in the chamber 20 for closing the contacts 433.

To start the printing machine, the Start Key is actuated to close the contacts 430 and energize the magnet FC for releasing the dog 107 so that it engages the notch 106 and effects a driving of the various mechanisms. The relay R1 is energized at the same time and closes the contacts R1*a*, but a holding circuit is not not completed through these relay contacts until the card lever 434 is actuated to close the contacts 433. As soon as a card is advanced to the card chamber 20 and closes the contacts 433, the Start Key may be released since the feed clutch magnet and the relay R1 will continue to be energized through the contacts 432, 433 and R1*a*. The cards are fed close enough to each other so that the forward edge of a card engages the lever 434 to hold the contacts 433 closed when the trailing edge of the card ahead moves out of engagement with the lever. This maintains the holding circuits for the relay R1 and the feed clutch magnet as long as cards are advanced from the feed hopper.

*Timing and operation*

Figure 19:
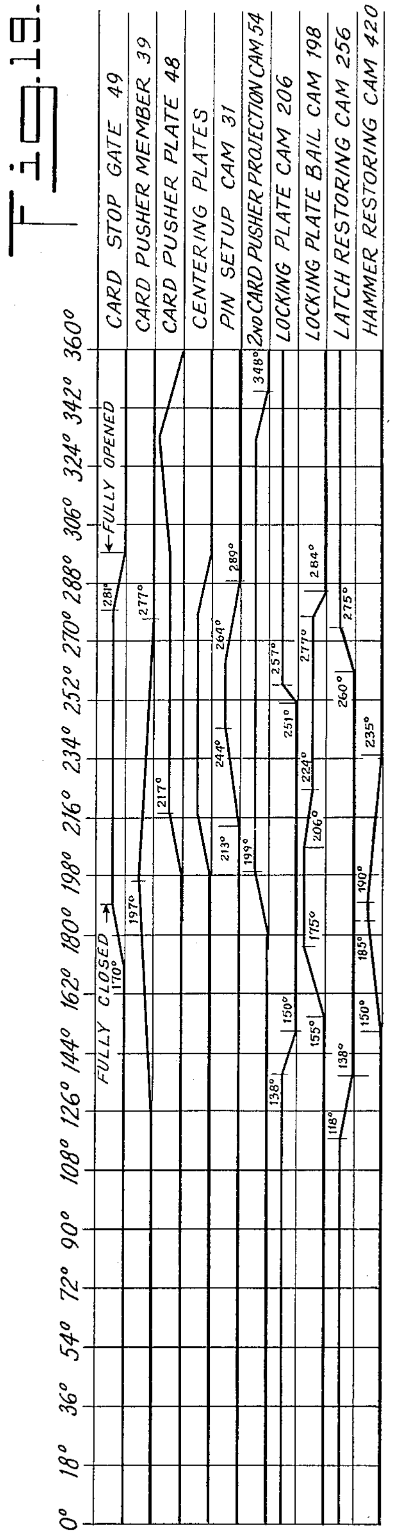
Fig. 19 is a timing diagram.

Assuming that the Start Key is operated to close the contacts 430 and energize the feed clutch magnet, the dog 107 is then released so that it engages the notch 106 in the clutch plate and effects a driving of the various mechanisms through one complete machine cycle. If the Start Key is held depressed until a card operates the card lever 434 to complete circuits through the relay R1 and the feed clutch magnet, the holding circuits are established and the mechanisms are driven continuously through successive machine cycles until either the Stop Key is operated or cards are no longer advanced from the hopper. At approximately 252° in the first cycle the card picker 10 engages a card to move it from the hopper 11 to the feed rolls 14, 15 which advance it part way into the card chamber 20. The hooked members 39 start moving in each cycle to the left in Fig. 2 at about 117°, as indicated by the timing diagram of Fig. 19, and the card advanced by the picker in the first cycle is picked up by the hooked members in the second cycle and advanced until the 197° point is reached. At this time the card pusher plate 48 picks up the card and advances it into the chamber 20 until it engages at 217° the stop gate 49 which was fully closed at 189° and is held closed until 281°. While the plate 48 is moving the card into the chamber, the centering plates 71 operates to center the card endwise. As soon as the card engages the stop gate and is centered by the plates 71, the cam 31 operates to lift the card chamber for effecting a sensing of the holes by the pins 150. The card chamber reaches its uppermost position at approximately 244° and is held there until 264° at which time it is moved downwardly until it reaches its lower position at 289°. While the card chamber is in its upper position the cam 206 starts moving the plates 168 in a direction to effect a locking of the pins in their adjusted positions. Locking of the pins is completed at 257° in one cycle and is maintained until 150° in the next cycle. Soon after the pins of each group are locked together by the lugs 163 on the members 162, the cam 256 operates to move the latches 235 to positions for engagement by the surfaces of the permutation blocks 250. The lugs 249 on the latches then cooperate with the lugs 248 on the pins for holding the pins against outward movement until the latches have been moved by the permutation blocks to positions corresponding to the set-up of the pins. The latches are in their control positions at 275° in the cycle, and at 277° the cam 198 operates to raise the bails 176 so that the locked pins may move outwardly when released by the latches. A releasing of the pins by the latches to effect printing is completed between 275° in one cycle and 118° in the next cycle when the cam 256 operates to retract the latches. As soon as the latches are retracted, the cam 206 moves the plate 168 to withdraw the lugs 163 from the notches in the pins, and then the cam 198 moves the bails 176 downwardly to engage the lugs 275 with the upper ends of the pins for returning the latter positively to their sensing positions. At 206° in the cycle, the cam 198 permits the bails 176 and the members 165 to move upwardly until the lugs 163 are in line with the notches 160 at the upper ends of the pins 150. Between 150° and 235° in each cycle the cam 420 actuates the bails 400 to retract all of the hammers 320 that were operated by a releasing of the pins to effect printing.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A mechanism for printing characters simultaneously in character spaces arranged in a plurality of parallel rows on a record sheet comprising, in combination, a plurality of groups of type members, one group being aligned with each of said rows of character spaces, means for moving said groups of type members simultaneously relative to said record sheet so that the type members in each group come successively into printing relation with the character spaces in the row with which it is aligned, settable means associated with each character space in each row for detecting the arrival of any selected type member in its aligned group at a certain position in relation to such character space, and means controlled by said detecting means for actuating said selected type members of each group to print in the related character spaces in the order in which they arrive at the character spaces of the row in which they are to print.

2. A mechanism for printing characters simultaneously in character spaces located in a plurality of parallel rows extending transversely of a record sheet comprising, in combination, a cylindrical platen for supporting said record sheet so that the rows on the latter extend parallel of the axis of the platen, a plurality of groups of type members, a type carrier slidably supporting said type members in positions normal to said platen and with the members of each group in line with a different row on said record sheet, means for moving said carrier so that the type members of each group come successively into printing relation with the character spaces in the row with which it is aligned, and means for selectively actuating said type members to print in a plurality of character spaces in each of said rows as the groups of members are moved with said carrier, said last mentioned means being adjustable to select for actuation, independently for each of the character spaces in which a character is to be printed, any one of said type members in a group associated with the row in which the character spaces are located, and to actuate the selected type members in the order in which they arrive at the character spaces in which they are to print.

3. A mechanism for printing characters simultaneously in a plurality of rows of character spaces on a record sheet comprising, in combination, a group of type members for each of said rows, means for circulating each group of type members so that it moves continuously in one direction along the row of character spaces with which it is associated, means for detecting the arrival of selected type members of each group at predetermined positions in relation to selected character spaces of its corresponding row, said detecting means comprising members having combinations of cam surfaces differentiated from each other to designate the various type characters on said type members, a plurality of control devices associated with the respective character spaces and adapted to sense said combinations of cam surfaces in succession, each control device being adjustable to respond to any one of said combination of cam surfaces, and means operable by said control devices when the latter respond to the combinations of cam surfaces for which they are adjusted, to cause the type members bearing corresponding characters to print in the respective character spaces with which the control devices are associated.

4. The printing mechanism of claim 3 in which said last mentioned means includes a closed flexible element carrying members having combinations of cam surfaces differentiated from each other to designate the various type characters on said type members, a plurality of control devices associated with said actuators and adapted to sense said cam surfaces, each control device being adjustable to respond to any one of said combinations of cam surfaces, means for circulating said element carrying said cam members so as to present said combinations of surfaces successively to said control devices in synchronism with the moving of corresponding type members past said actuators, and means operable by said control devices when the latter respond to any of said combinations of surfaces, to effect an actuation of said actuators associated therewith.

5. A mechanism for printing characters in character spaces located in a plurality of rows on a record sheet comprising, in combination, a plurality of independently operable printing actuators arranged in rows opposite the rows of character spaces on said record sheet, a closed flexible element having a plurality of type carriers mounted thereon, type members reciprocably supported by said carriers in rows and adapted to be engaged by said actuators for printing in said character spaces, means for circulating said element so that the type members pass said actuators in their respective rows in sequence for engagement thereby, a closed flexible element carrying members having combinations of cam surfaces differentiated from each other to designate the various type characters on said type members, a plurality of control devices, one associated with each of said actuators, adapted to sense said cam surfaces, said control devices arranged in a single row and each being adjustable to respond to any one of said combinations of cam surfaces, means operatively connecting each of said control devices with the actuator associated therewith, said last mentioned means operating upon the release of one of said control devices for effecting operation of the actuator with which it is associated, and means for circulating said element carrying said cam members so as to present said combinations of cam surfaces successively to said control devices in synchronism with the moving of corresponding type members past said actuators.

6. A printing mechanism comprising, in combination, a platen supporting a record sheet, printing actuators arranged in line with character spaces lying in a plurality of rows on said record sheet, a group of type members for each of said rows, said type members carrying elements adapted to print predetermined type characters, means for moving said type members of each group past said actuators in sequence for actuation thereby, separate control means differentiated from each other in accordance with said characters, devices adjustable to positions representative of the characters to be printed and each adapted to respond to the one of said control means corresponding to the character for which it is adjusted, means for moving said control means in sequence to positions at which said devices may respond thereto, and separate means operatively connecting said devices to said printing actuators for effecting an operation of the latter when said devices respond to said control means.

7. A cyclically operable mechanism adapted to read character data from columns of a card and to print such data in a plurality of rows on a record sheet within a single cycle comprising, in combination, a plurality of devices adapted to read data in the separate card columns and being adjustable to positions varying with the data read, separate control means differentiated from each other in accordance with the characters of the data to be printed, said devices being responsive to said control means representative of the characters for which the devices are adjusted, means for presenting said control means sequentially to said devices for effecting a response of the latter, a platen supporting said record sheet, a plurality of printing actuators arranged in rows spaced from said record sheet, means operatively connecting said devices to said printing actuators and operative to effect an actuation of the latter when said devices respond to said control means, type members for each row of printing actuators carrying elements for printing all the characters of the data, and means for moving said type members sequentially to positions for engagement by said actuators in synchronism with the presenting of corresponding control means to said devices.

8. A mechanism for reading character data appearing in columns of a card and printing such data on a record sheet comprising, in combination, a plurality of devices adapted to read simultaneously all of the data on said card, each of said devices arranged to sense data in a separate card column and being adjustable to positions varying with the data sensed, separate means for locking said devices in their adjusted positions, separate control means differentiated from each other in accordance with said characters and cooperating successively with said locking means for effecting an unlocking of a device when the character represented by the control means corresponds to the character for which the device is adjusted, a printing hammer associated with each of said devices, a platen supporting said record sheet, a plurality of type bars bearing elements for printing the various characters, means for moving said type bars successively to positions for actuation by said hammers to engage said record sheet, said type bars moving past each hammer in synchronism with the cooperation of corresponding control means with the locking means for the device associated with said hammer, and means operable upon the unlocking on any one of said devices for actuating the hammer associated therewith.

9. A mechanism for reading character data appearing in columns of a card and printing such data on a record sheet comprising, in combination, a plurality of devices adapted to read simultaneously all of the data on said card, each of said devices arranged to sense data in a separate card column and adjustable to positions varying with the data sensed, separate means for locking said devices in their adjusted positions, members having combinations of cam surfaces differentiated from each other to designate the various type characters, each of said locking means engageable with said cam surfaces when locking said devices and operable thereby to effect an unlocking of its device upon engagement by a combination of surfaces representative of the character for which the device is adjusted, means for moving said members so as to present said combinations of cam surfaces successively to said locking means, a platen supporting said record sheet, a printing hammer associated with each of said devices, said printing hammers arranged in a row spaced from said platen, a plurality of type bars bearing elements for printing the various characters, means for moving said type bars past said hammers in synchronism with the movement of said combinations of cam surfaces past said locking means, and means operable upon the unlocking of said devices for actuating said hammers associated therewith to engage type bars so as to effect a printing by the latter upon said record sheet.

10. A mechanism for reading character data represented by code perforations in columns of a card and printing such data on a record sheet comprising, in combination, a plurality of devices adapted to sense said perforations, each of said devices arranged for sensing perforations in a separate card column and being adjustable to positions varying with the combinations of perforations sensed, means including a plurality of latches for locking each of said devices in its adjusted positions, said latches being movable selectively to different positions and operative to effect a release of the device controlled thereby when moved to positions representative of the character for which the device is adjusted, means for moving said latches successively to positions representative of the characters to be printed, a platen supporting said record sheet, a plurality of hammers arranged in a row spaced from said platen and each associated with a different one of said devices, means operative upon the release of any one of said devices for effecting an operation of the hammer associated therewith, a plurality of type members bearing elements for printing the different characters, and means for moving said type members successively to positions for engagement by said hammers in synchronism with the movement of said latches to positions representative of the characters which said type members are adapted to print.

11. The mechanism of claim 10 in which said means for moving said latches comprises members having combinations of cam surfaces representative of the characters to be printed, and means for moving said members so as to bring said combinations of cam surfaces successively into positions for effecting movement of the latches locking each of said devices.

12. The mechanism of claim 10 in which said platen is of cylindrical shape and said hammers are arranged in a plurality of rows, the hammers of each row extending normal to said platen, and said type members are arranged to provide at least one group for each row of hammers, each group of type members being adapted to print all of the characters.

13. The mechanism of claim 10 in which each of said devices comprises a plurality of pins adapted to be engaged by said card at points where perforations may be located in a card column, said pins being movable to different positions depending upon whether or not perforations are sensed.

14. A mechanism for reading character data represented by code perforations at predetermined index points in columns of a card and printing such data on a record sheet comprising, in combination, a plurality of devices adapted to sense said perforations, each of said devices comprising a plurality of pins arranged for engagement with the index points of a card column and movable to different positions when no perforations are sensed, means for moving a card to effect a sensing of the index points in all card columns simultaneously by said devices, a member adapted to lock said pins for each of said devices against movement relative to each other after sensing said perforations, means for yieldingly urging said member with said pins to an operating position, a plurality of latches engageable with said pins for holding the latter and said member against movement by said yielding means, said latches being movable selectively into and out of engagement with said pins and operative to release the latter when moved to positions representative of the character for which the pins are positioned, means for moving said latches successively to positions representative of the characters to be printed, a plurality of hammers, one associated with each of said devices, means operative upon the movement of said member to its operating position for effecting an actuation of the hammer associated therewith, a plurality of type bars, adapted to be moved selectively by said hammers into engagement with said record for printing the various characters, and means for moving said type bars successively to positions for engagement by said hammers just after said latches for the devices associated therewith have been moved to positions representative of the characters which said type bars are adapted to print.

15. A mechanism for reading character data represented by code perforations at predetermined index points in columns of a card and printing such data on a record sheet comprising, in combination, a card chamber, means for feeding a card to and centering it within said card chamber, a plurality of devices adapted to sense perforations in said card when centered in said chamber, each of said devices comprising a plurality of pins arranged in line with index points of a card column, means for supporting said pins loosely in their sensing positions, means for effecting a relative movement between said card chamber and said pins so that the latter sense said card for perforations and are displaced if no perforations are sensed, a member adapted to lock said pins for each of said devices against movement relative to each other after sensing said card, means for yieldingly urging said member with said pins to an operating position, a plurality of latches engageable with said pins for holding the latter and said member against movement by said yielding means, said latches being movable selectively into and out of engagement with said pins and operative to release the latter when moved to positions representative of the character for which the pins are positioned, means for moving said latches successively to positions representative of the characters to be printed, a plurality of hammers, one associated with each of said devices, means operative upon the movement of said member and said pins of each of said devices to said operating position for effecting an actuation of the hammer associated therewith, a plurality of type bars adapted to be moved selectively by said hammers into engagement with said record for printing the various characters, and means for moving said type bars successively to positions for engagement by said hammers in synchronism with the movement of said latches for the devices associated therewith, to positions representative of the characters which the type bars are adapted to print.

16. The mechanism of claim 15 in which said devices are arranged for sensing perforations in columns lying in different decks of a card, the columns in one deck being in line with the columns in another deck, and said latches engageable with the sensing pins for each column in one deck being engageable also with the pins for the aligned column in the other deck and operative to control their release.

17. The mechanism of claim 15 including means for yieldingly urging each of said hammers in a direction to engage said type bars, latch members engageable with said hammers for holding the latter in cocked positions against the action of said yielding means, interposers adapted to be actuated for releasing said latch members, continuously rotating toothed members engageable with said interposers for actuating the latter, and means operating upon the release of said pins for effecting an operative engageament between said interposers and said toothed members.

18. In a printing mechanism, a platen for supporting a record sheet, a type carriage, means for moving said carriage continuously in one direction along a path parallel to said platen, type members supported by said carriage for movement in a direction toward said platen to effect a printing impression on said record sheet, said carriage also supporting the ends of said type members adjacent said platen for limited movement relative to said carriage in the path of carriage travel when said type members strike said platen, spring means attached to said type members for urging the latter away from said platen and in a direction reverse to said limited movement, and means adapted to impel said type members toward said platen during movement of said carriage.

19. A device for reading and storing data represented on code records by code designations placed at different index point positions comprising, in combination, a plurality of elements adapted to sense simultaneously said code designations and to be displaced thereby, means for locking said elements after sensing against movement relative to each other, means tending to displace said elements further while engaged by said locking means, a plurality of latches engageable with said elements for holding them against further displacement, said latches being movable selectively into and out of engagement with said elements and operative to release the latter when moved to positions representative of the data sensed, and means for moving said latches successively to positions representative of data which may be indicated by said code designations.

20. In a printing mechanism, a platen for supporting a record sheet, a type carriage, means for moving said carriage along a path parallel to said platen, type members supported by said carriage for movement in a direction normal to said platen to effect a printing impression, a latch pivotally supported adjacent the outer end of each of said type members and having a nose receivable within a notch in its associated type member for limiting movement of the latter outwardly, a spring connecting said latch to its associated type member for urging the latter outwardly while urging the nose of said latch within said notch to latch the type member, a tail portion on said latch engaging the outer end of said type member when the latter is in its latched position, and means engageable with said tail portion for rocking said latch to disengage the nose from said notch and to cause said tail portion to impel said type member toward said platen to effect a printing impression.

21. In a mechanism for printing a plurality of characters simultaneously in a plurality of aligned character spaces on a stationary record sheet, a plurality of independently operable hammers positioned in uniform spaced relation to the line of said character spaces, one hammer being opposite each character space, a type carrier having a group of type members arranged thereon in a line parallel to the line of said character spaces, means for moving said type carrier continuously in one direction so that said group of type members passes said hammers repeatedly in a fixed path with each of said type members moving through positions in alignment with each of said hammers and the character spaces associated therewith, and means for actuating said hammers selectively to effect printing engagement of said type members with said record sheet as the type members pass through positions in alignment with the hammers actuated.

22. A cyclically operable machine adapted to read data from columns of a card and to print such data in a plurality of aligned character spaces simultaneously on a stationary record sheet within a single cycle comprising, in combination, a plurality of independently operable hammers positioned in uniform spaced relation to the line of said character spaces, one hammer being opposite each character space, a movable type carrier having a group of type members arranged thereon in a line parallel to the line of said character spaces, means for moving said type carrier continuously in one direction so that said group of type members passes said hammers repeatedly in a fixed path with each of said type members moving through positions in alignment with each of said hammers and the character spaces associated therewith, a plurality of devices adapted to read the data in the different card columns, and means associating each of said reading devices with a different one of said hammers and operating at a time dependent upon the data read for actuating the hammer associated therewith to effect a printing engagement of the corresponding type member with said record sheet.

References Cited in the file of this patent

UNITED STATES PATENTS

| | | |
|---|---|---|
| 469,931 | Briggs | Mar. 1, 1892 |
| 1,547,744 | Fuller | July 28, 1925 |
| 1,857,918 | Kohler | May 10, 1932 |
| 2,053,063 | Bryce | Sept. 1, 1936 |
| 2,189,044 | Paris | Feb. 6, 1940 |
| 2,244,242 | Buhler | June 3, 1941 |
| 2,398,036 | Paris | Apr. 9, 1946 |
| 2,524,127 | Johnson | Oct. 3, 1950 |